Figure 15:
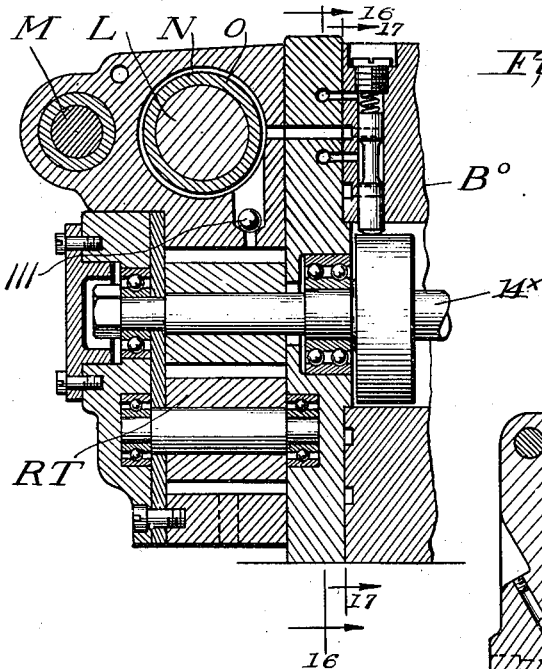

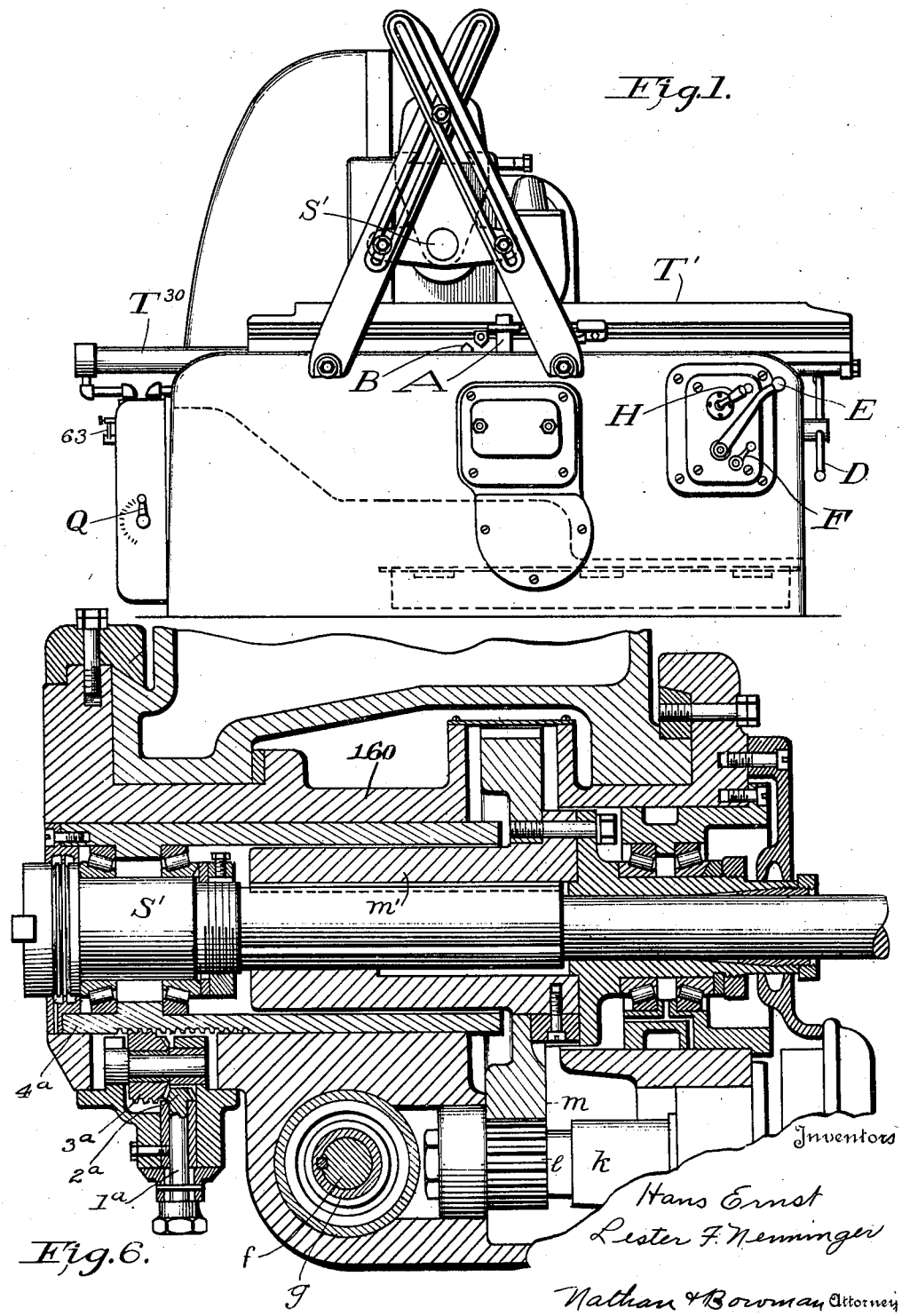

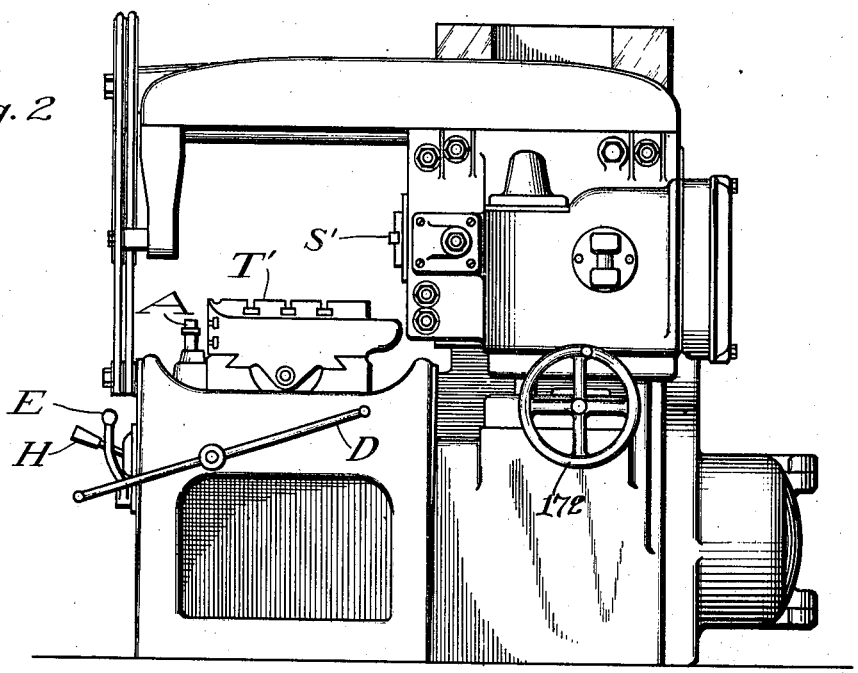
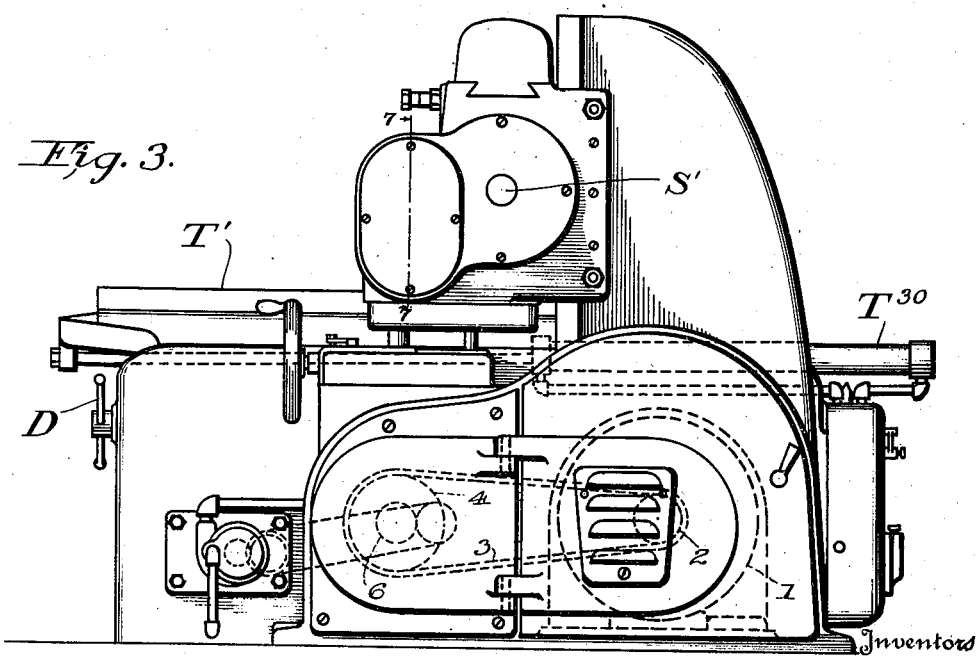

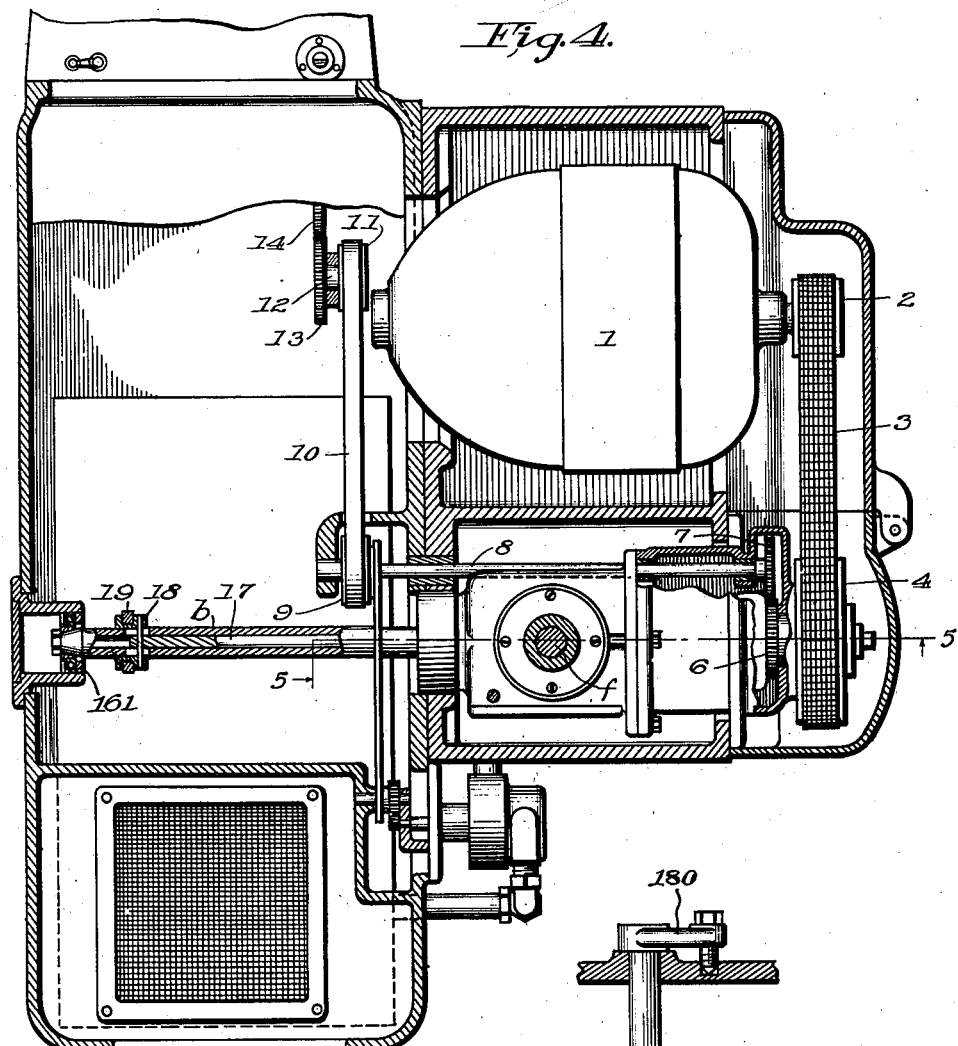

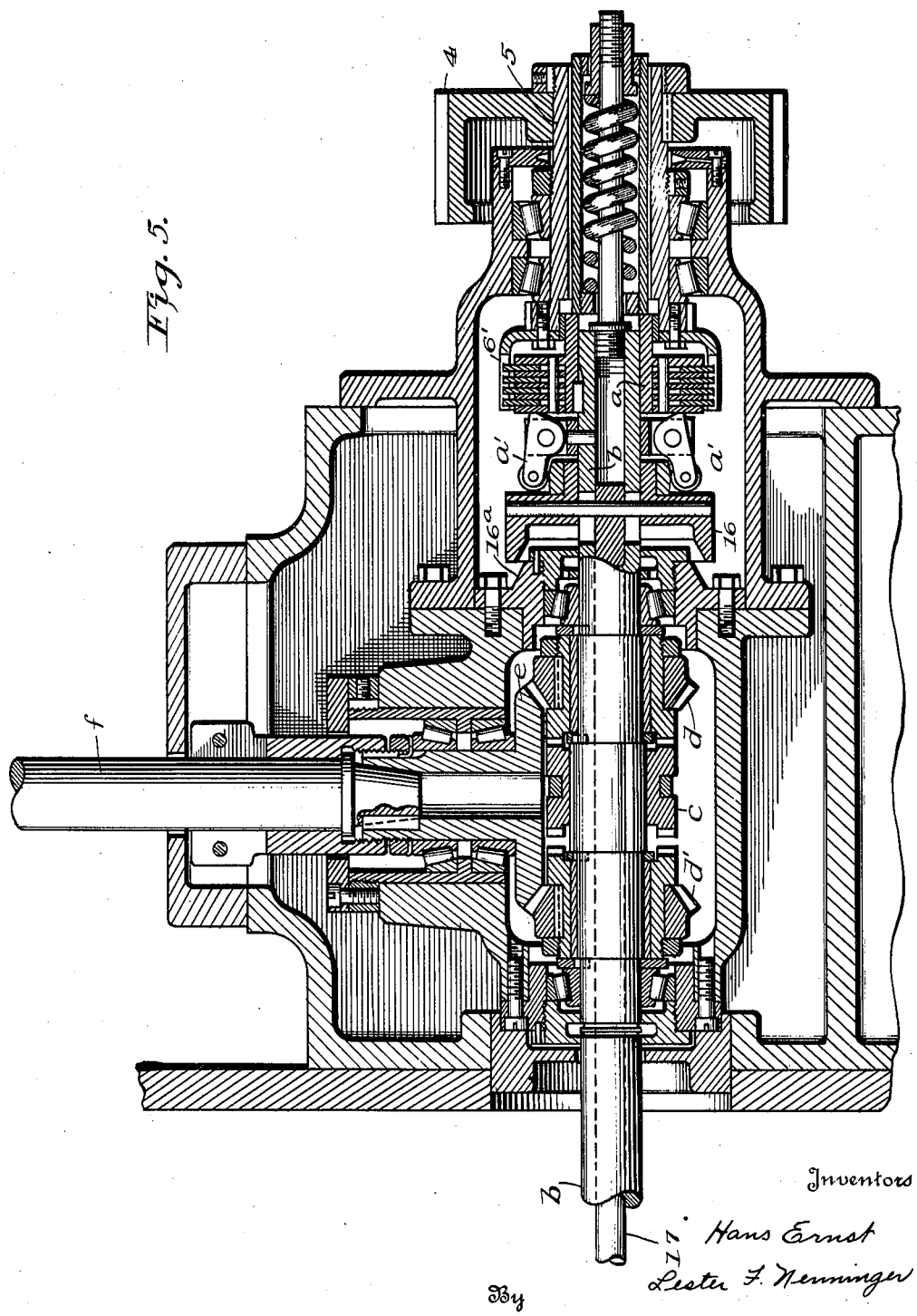

Nov. 5, 1935.                H. ERNST ET AL                      2,019,486
                      HYDRAULICALLY PROPELLED MACHINE TOOL
                      Filed Sept. 15, 1927        18 Sheets-Sheet 5
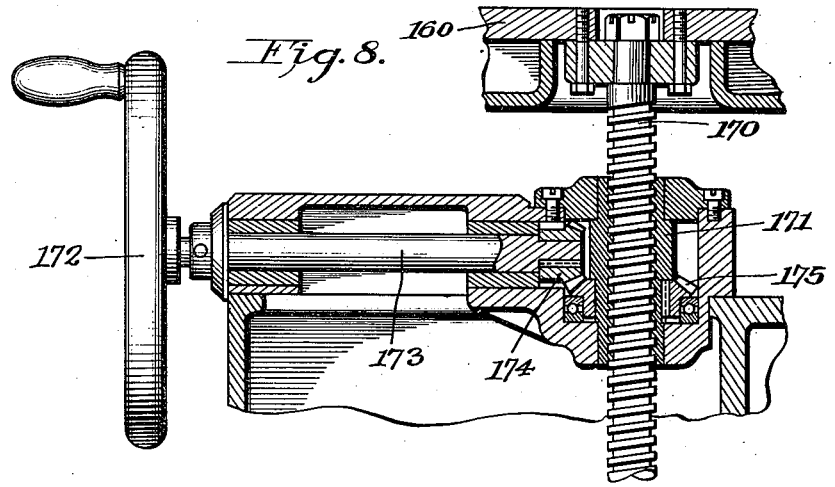
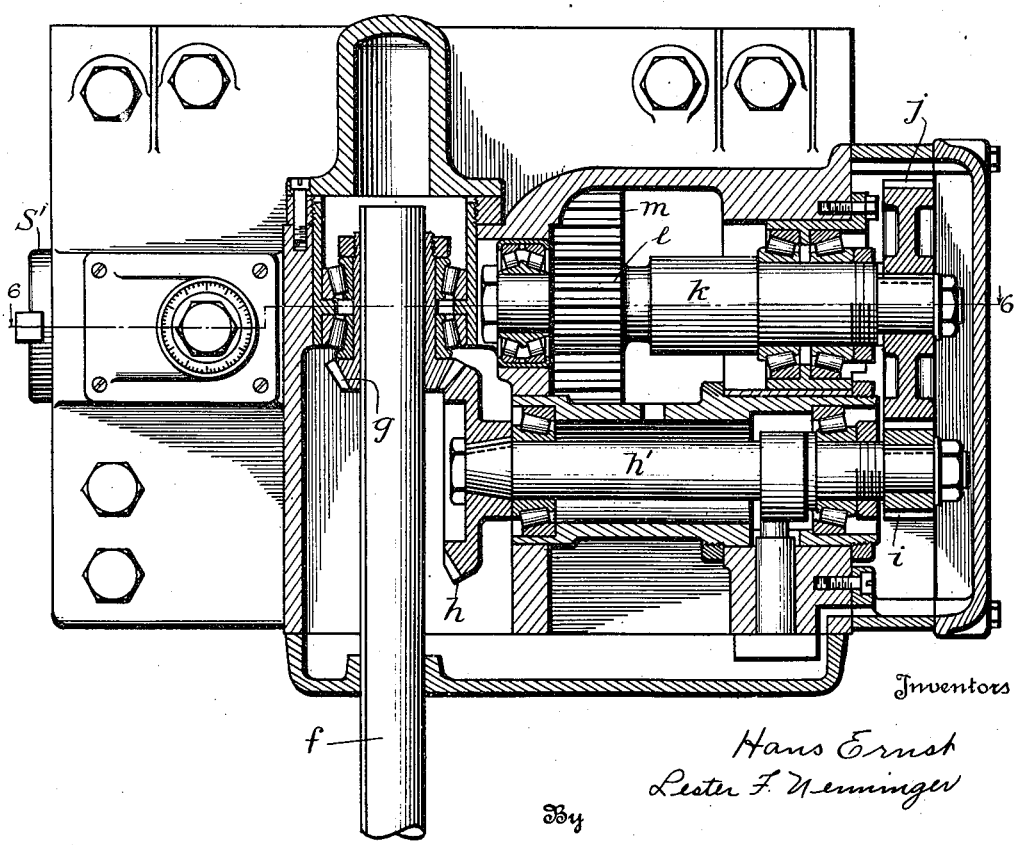

Nov. 5, 1935.                H. ERNST ET AL                    2,019,486
                    HYDRAULICALLY PROPELLED MACHINE TOOL
                    Filed Sept. 15, 1927       18 Sheets-Sheet 6
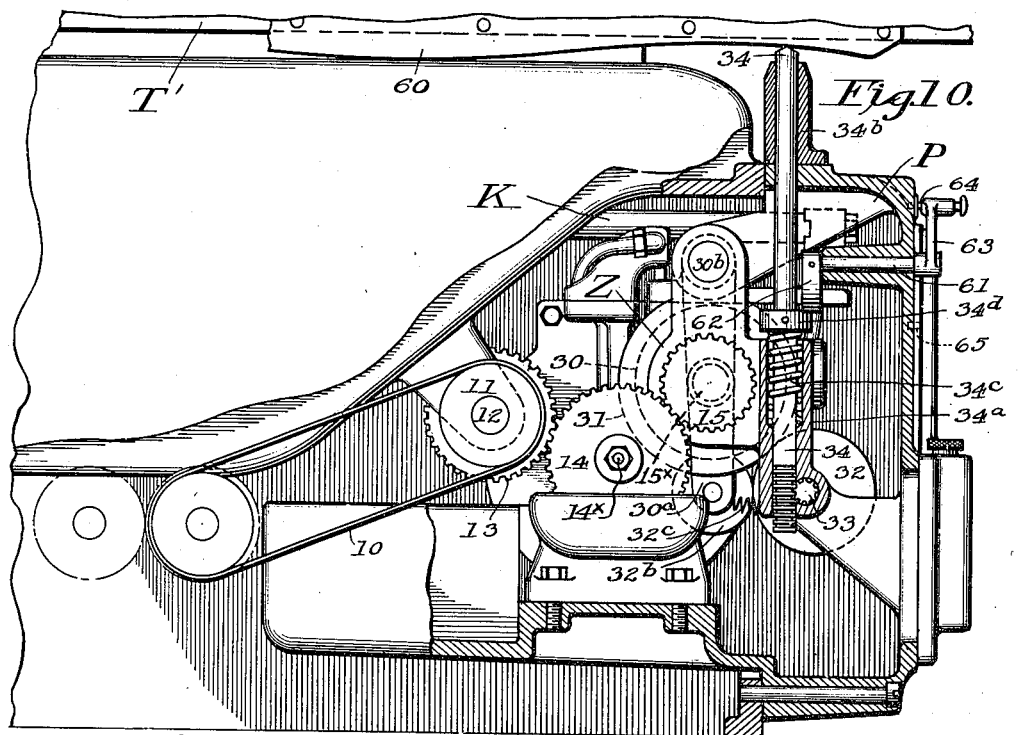
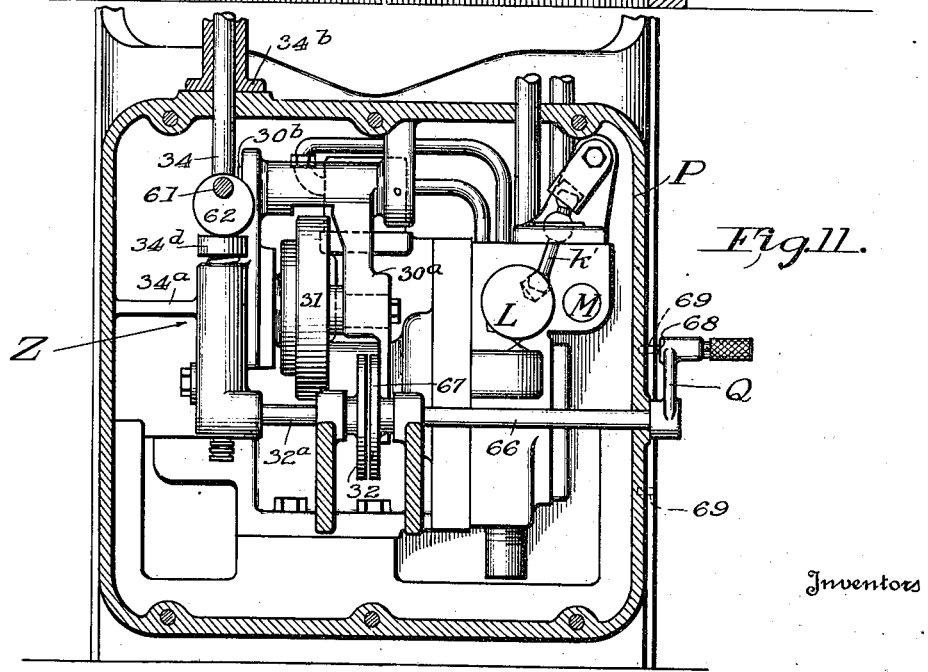
Inventors
Hans Ernst
Lester F. Nenninger
By Nathan & Bowman, Attorneys

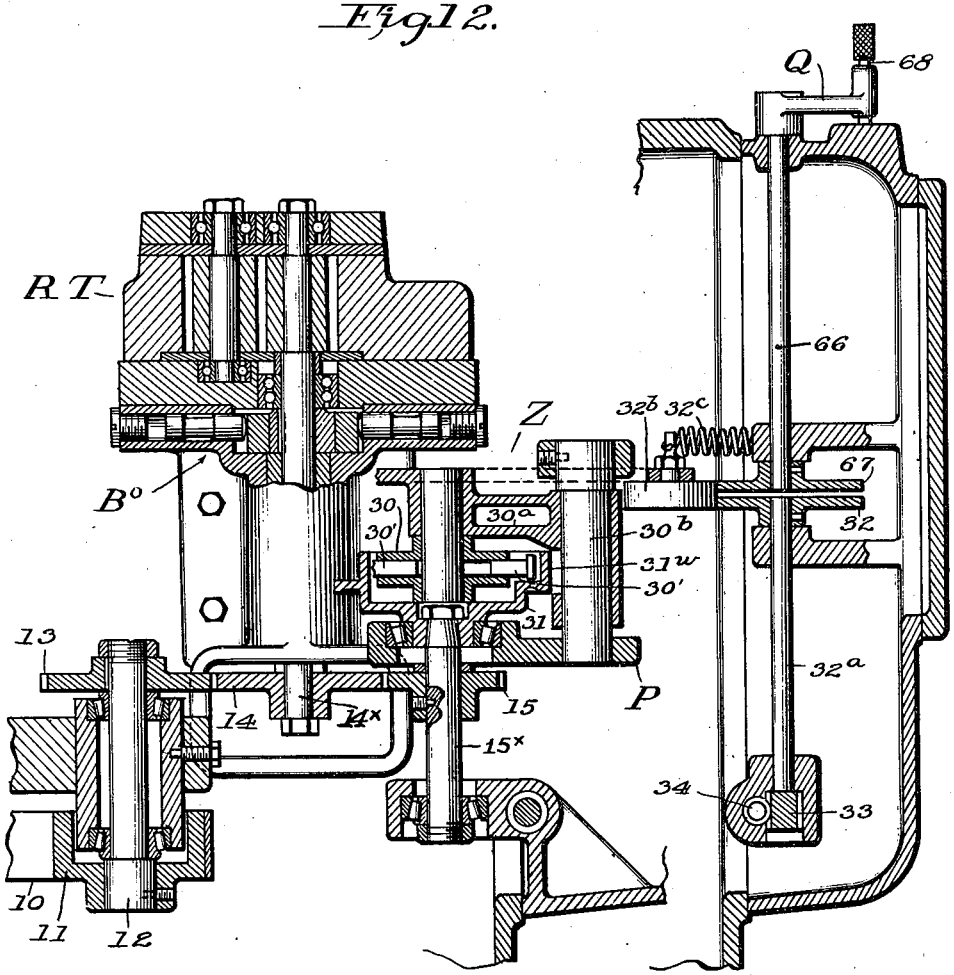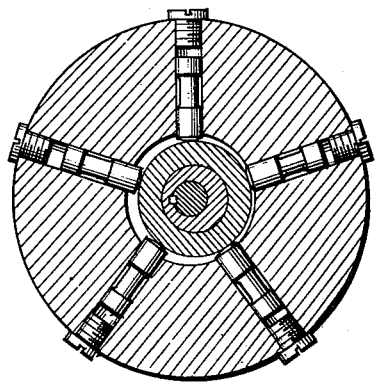

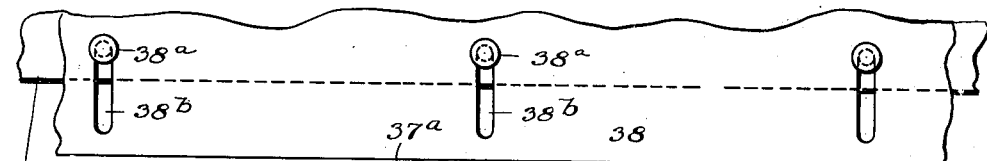
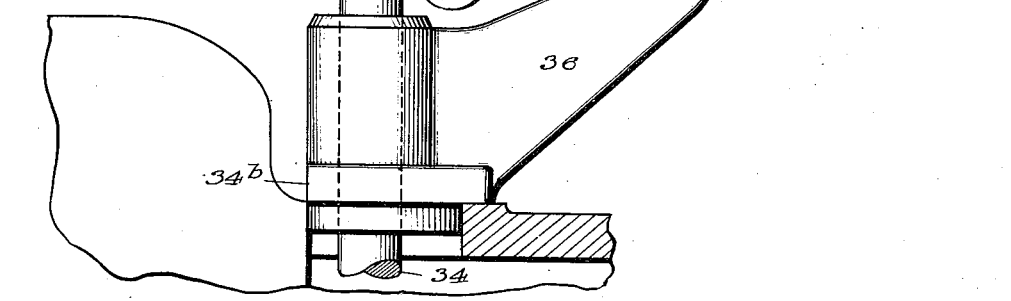
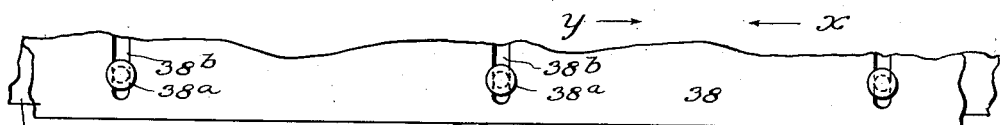
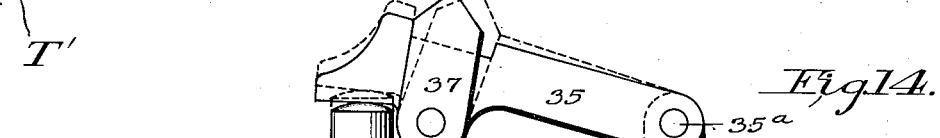

Nov. 5, 1935.  H. ERNST ET AL  2,019,486
HYDRAULICALLY PROPELLED MACHINE TOOL
Filed Sept. 15, 1927  18 Sheets-Sheet 9

Inventors
Hans Ernst
Lester F. Nenninger
By
Nathan & Boroman
Attorneys

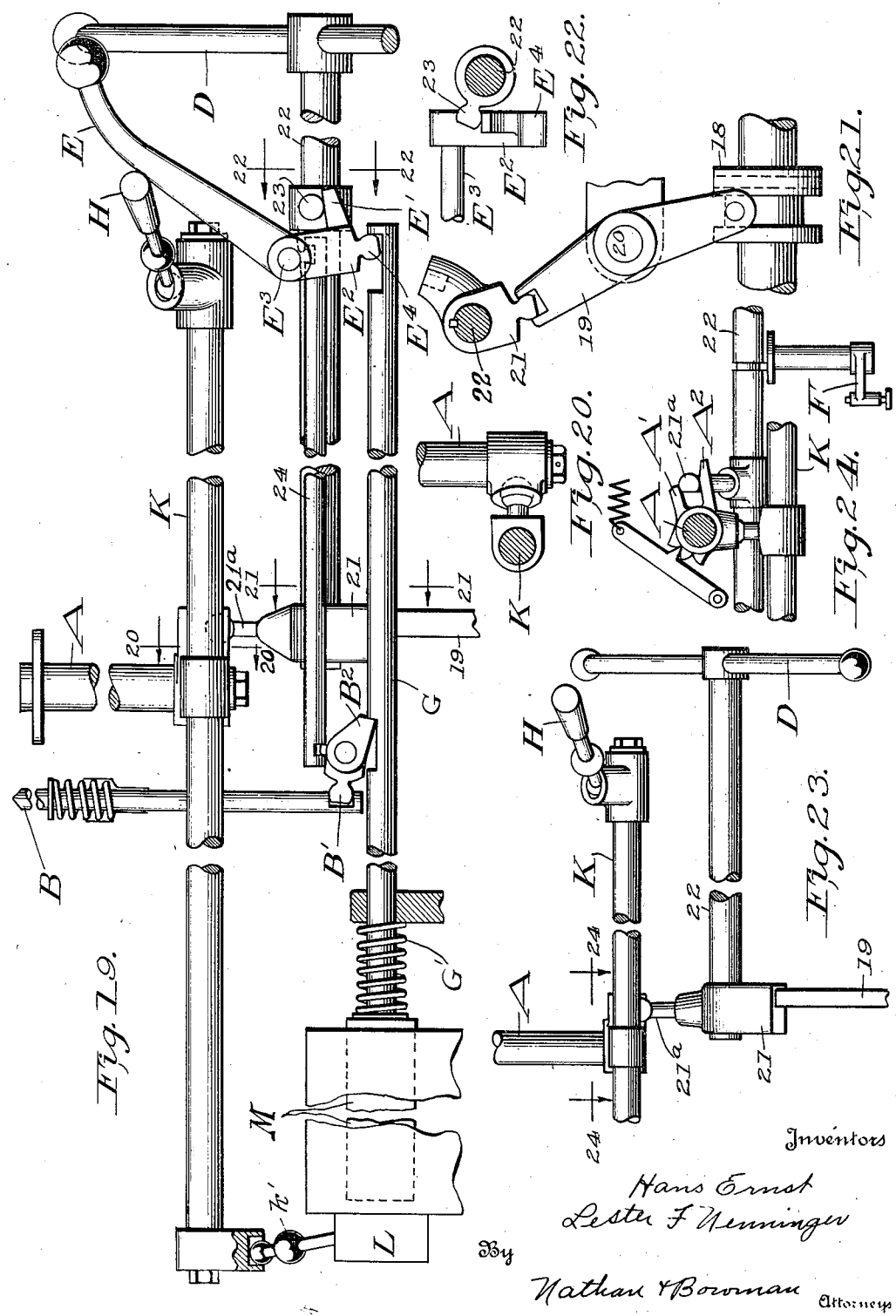

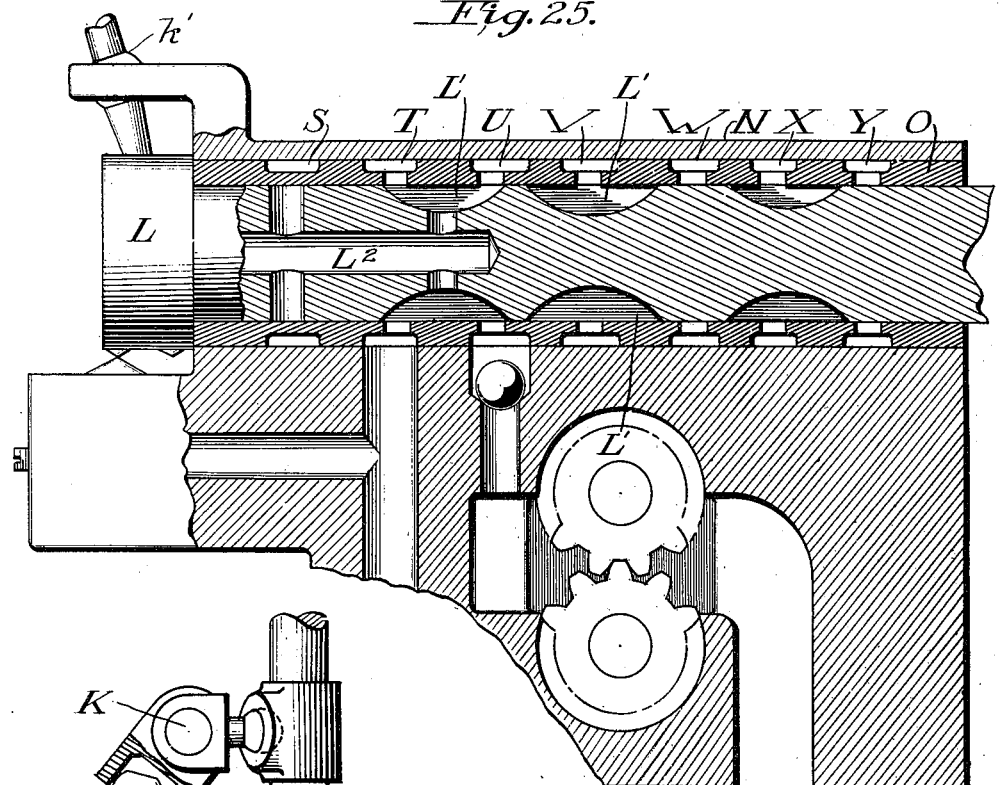
Fig. 25.
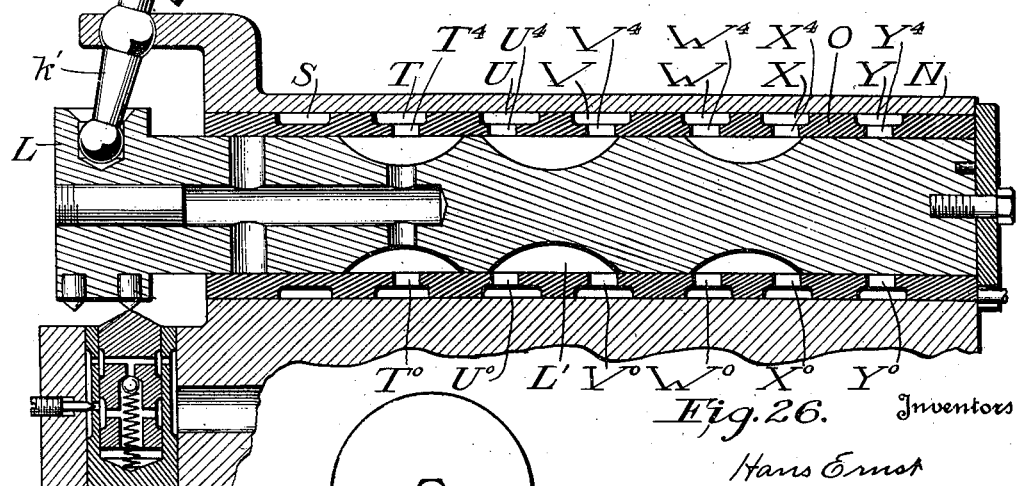
Fig. 26.
Fig. 27.

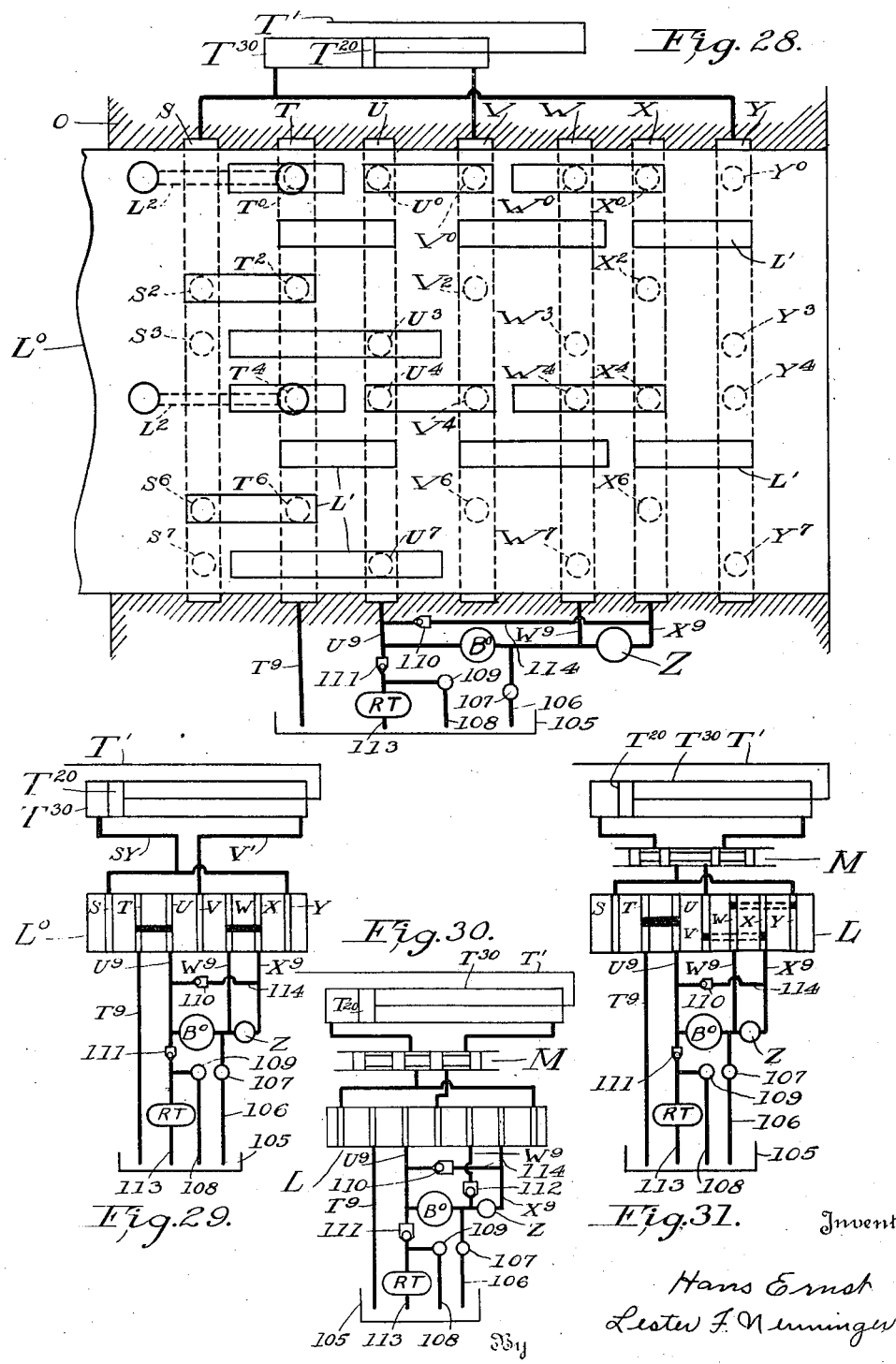

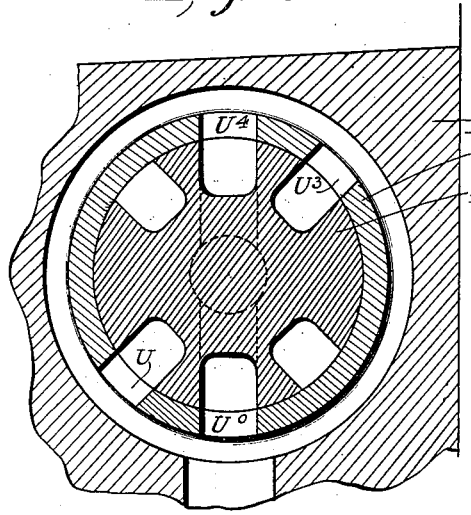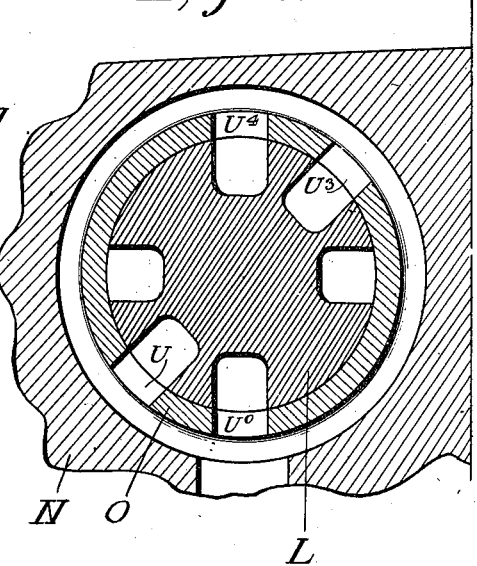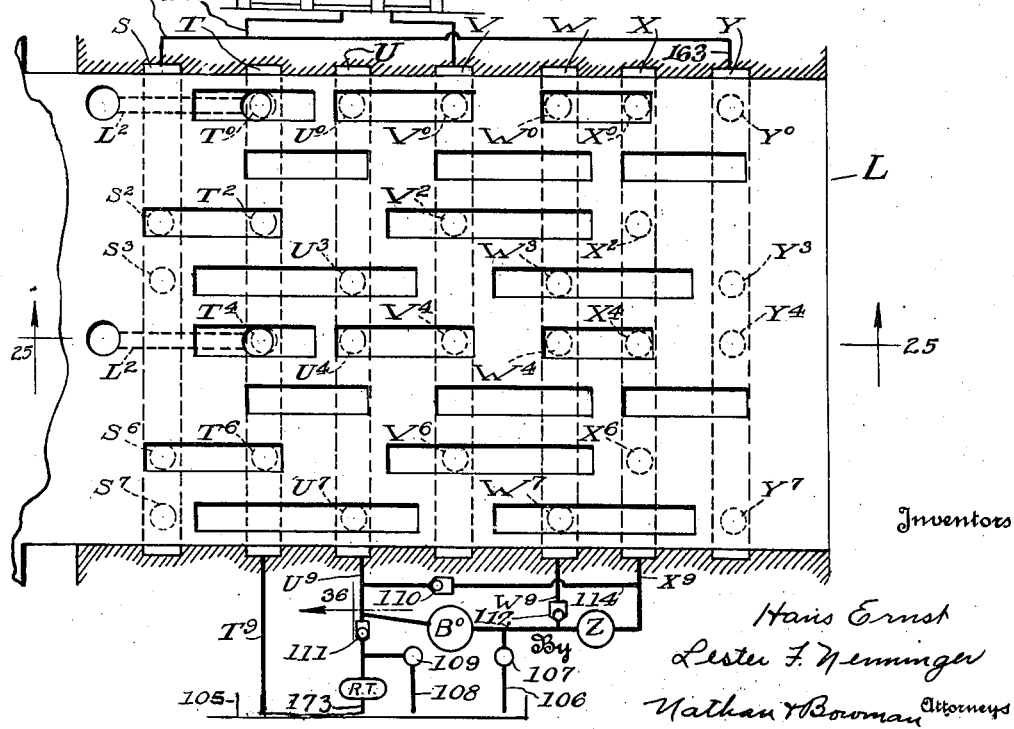

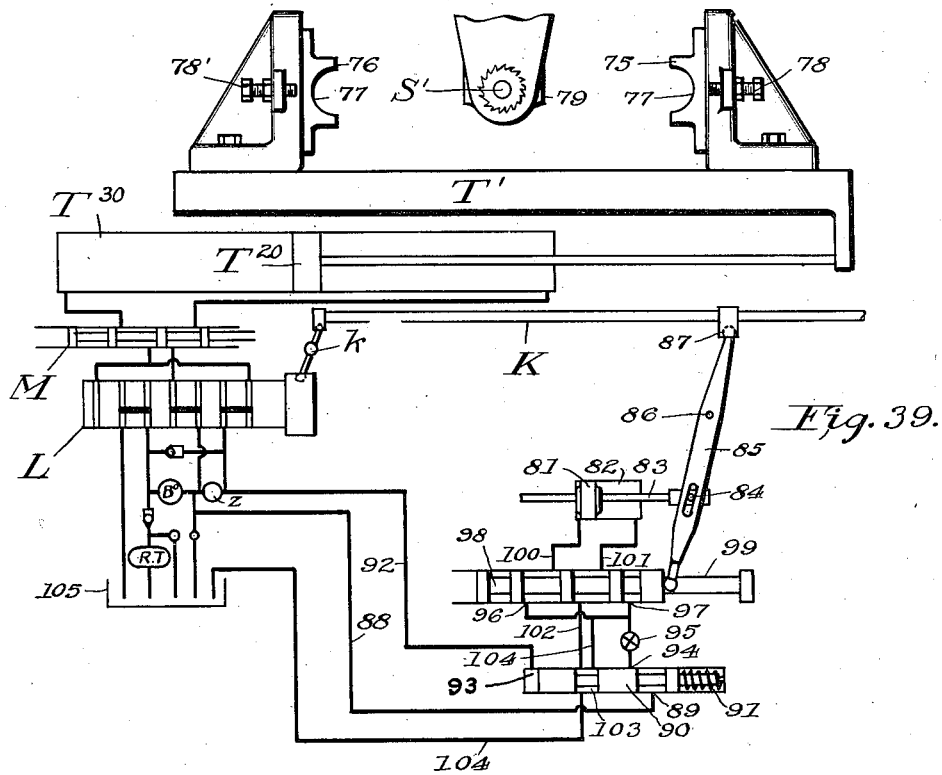
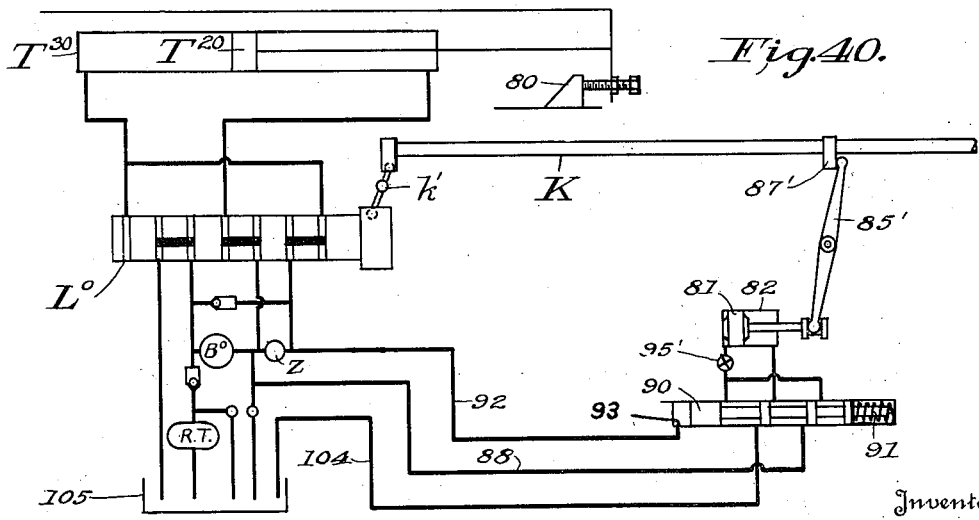

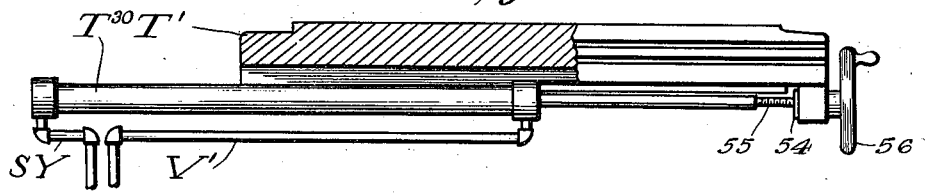
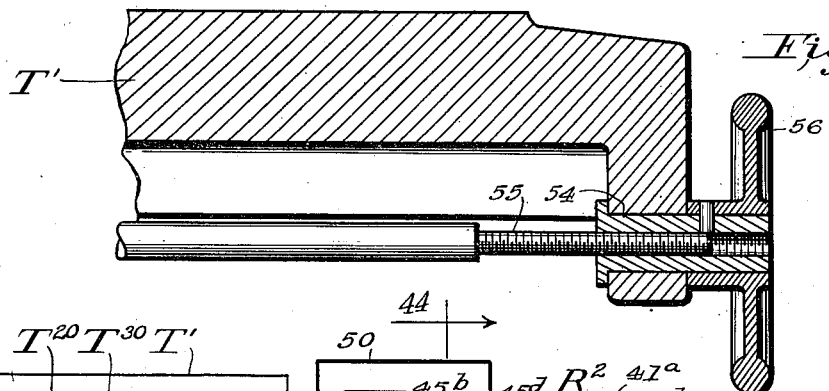
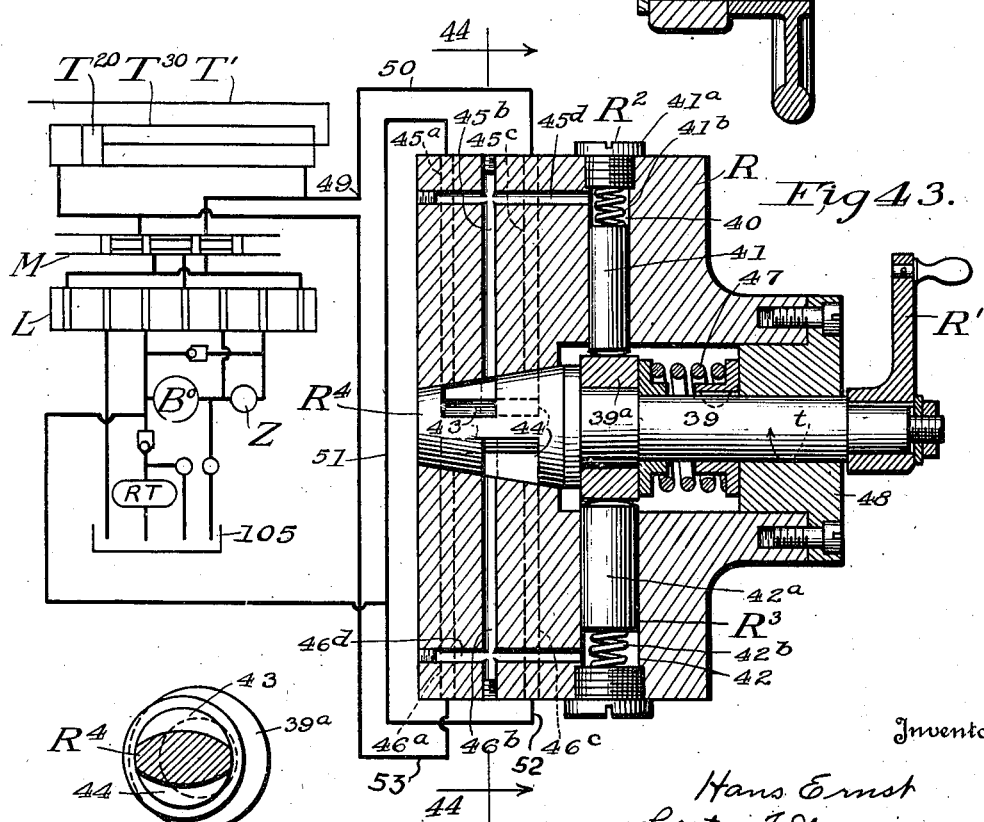
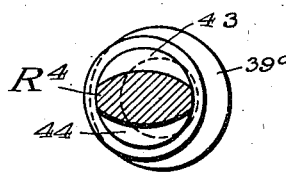

Nov. 5, 1935. H. ERNST ET AL 2,019,486

HYDRAULICALLY PROPELLED MACHINE TOOL

Filed Sept. 15, 1927 18 Sheets-Sheet 17

Nov. 5, 1935.  H. ERNST ET AL  2,019,486
HYDRAULICALLY PROPELLED MACHINE TOOL
Filed Sept. 15, 1927   18 Sheets-Sheet 18

Inventors
Hans Ernst
Lester F. Nenninger
By Attorney
Nathan & Bowman

Patented Nov. 5, 1935

2,019,486

UNITED STATES PATENT OFFICE 2,019,486

HYDRAULICALLY PROPELLED MACHINE TOOL

Hans Ernst and Lester F. Nenninger, Cincinnati, Ohio, assignors to The Cincinnati Milling Machine Company, Cincinnati, Ohio, a corporation of Ohio Application September 15, 1927, Serial No. 220,721

38 Claims. (Cl. 90—21.5)

Conventional machine tools of the purely mechanical type have attained a high state of development and have become highly automatic requiring many involved parts in the nature of control elements and many gears, shafts and bearings for conveying the motion in clockwise and counter-clockwise directions at various rates to different points in the machine. With this development there has simultaneously occurred a demand for increased power; a transmission of which has tended to result in a certain amount of chatter or vibration due to the elasticity of the metal employed.

It is the general aim of this invention to effect a simplification of the machine by using a fluid such as oil for the transmission of the various forces and motions required at the various points and by so contriving the hydraulic system that it will compel movements of a very positive and smooth nature governed by a simplified control system operable automatically to yield various cycles.

As applied, for example, to a milling machine there is disclosed herein a single control valve element between the source of fluid and the table propelling hydraulic motor, this single valve element being mounted so that it may be shifted in either an oscillatory or a reciprocatory manner and being so contrived that when so shifted it will yield either a rapid traverse movement or a feed in either direction. This invention further proposes means for shifting this valve in a selective orderly sequence to yield various cycles of table movement. For example, either an intermittent feed in one or in both directions such as a one-way cycle or a reciprocating cycle where the table makes a quick traverse followed by a feed in one direction and either a quick traverse alone or a quick traverse followed by a feed in the other direction. It is proposed in certain adaptations to supplement the main valve with an auxiliary valve for stopping the table movement during a reciprocative cycle, but using the main valve alone for stopping the table during a one-way cycle. It is proposed to employ opposed hydraulic forces so that when the table is thus stopped there may be no possibility of further movement due to the contact between the cutter and the work.

This invention also proposes manual means, either hydraulic or mechanical, for shifting the table when hydraulically locked, and with the table there is combined an indicator for measuring its movements and for denoting its position. It also proposes manual means for regulating the rate of feed, for throwing in or out the quick traverse in either direction, for rendering the feed impotent, etc. It proposes likewise automatic means for varying the feed (a) to satisfy varied shapes of work and (b) to compensate for the differential rate of the hydraulic motor according to its direction of propulsion, etc.

It also proposes to put into practical effect and to improve upon the inventions set forth in the copending application of Hans Ernst filed Aug. 9, 1926, Serial No. 128,167; all is set forth hereinafter.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 16:
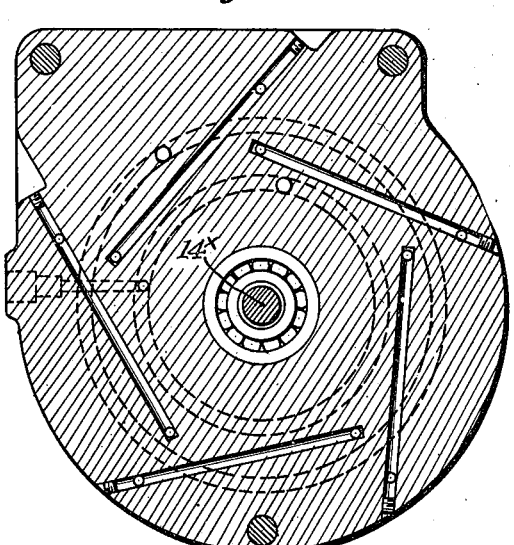
Figure 17:
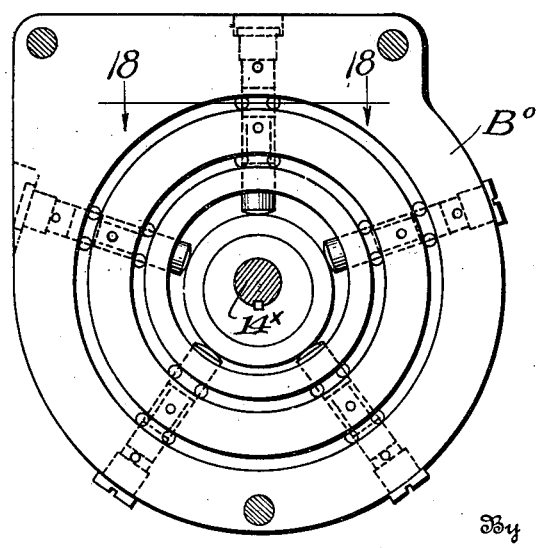

Figure 1 is a front elevation of the machine. Fig. 2 an elevation of its right hand end. Fig. 3 an elevation of its rear. Fig. 4 a horizontal section showing its motor drive. Fig. 5 a vertical section through line 5—5 of Fig. 4 showing the spindle stop, start and reversing mechanism. Fig. 6 is a horizontal section through line 6—6 of Fig. 7 which is a vertical section through line 7—7 of Fig. 3. Fig. 8 is a detail of the hand elevator for raising and lowering the spindle carrying head. Fig. 9 is a detail of the clutch for manually setting the spindle to rotate clockwise or counter-clockwise. Fig. 10 views from the rear partially in vertical section and partially in elevation the hydraulic unit with its valve casing and its feed variator. Fig. 11 is an elevation looking at the left hand end of the machine of the aforesaid hydraulic unit. Fig. 12 is a horizontal section through said unit. Fig. 13 is an elevation looking from the rear at the left end of the table and showing an automatic feed variator for compensating for the displacement of the piston rod which propels the table. Fig. 14 is a similar view showing this device set to yield a different rate of feed. Fig. 15 is a vertical section showing details of the low pressure high capacity pump and of the booster pump. Fig. 16 is a section through line 16—16 of Fig. 15 showing the channeling of the casing for the booster pump. Fig. 17 is an end elevation of the casing plate shown by Fig. 16.

Figure 18:
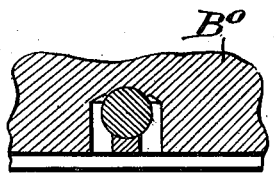
Figure 32:
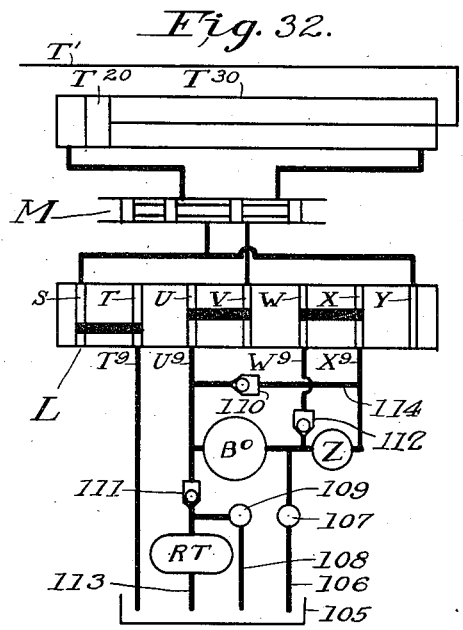
Figure 33:
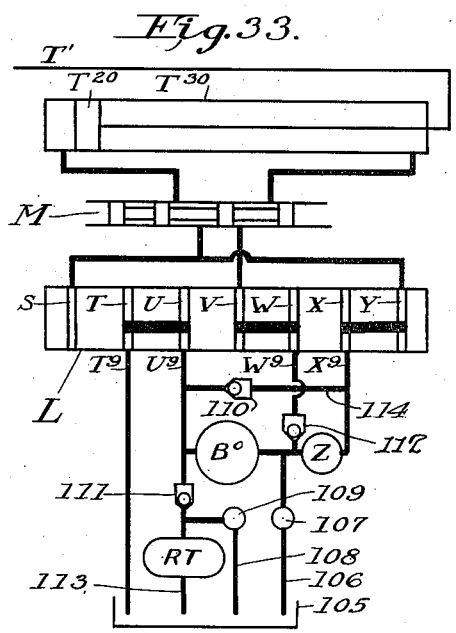
Figure 34:
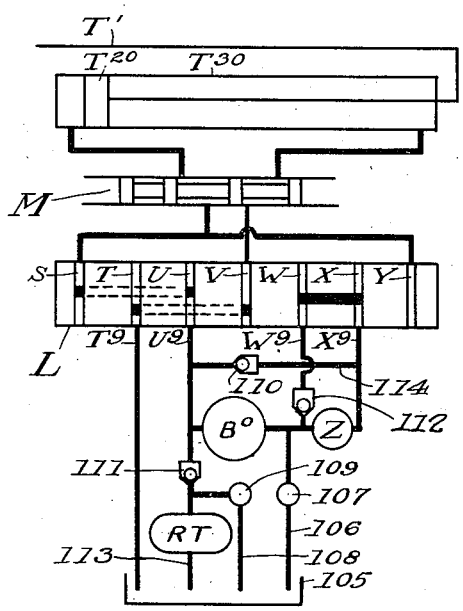
Figure 47:
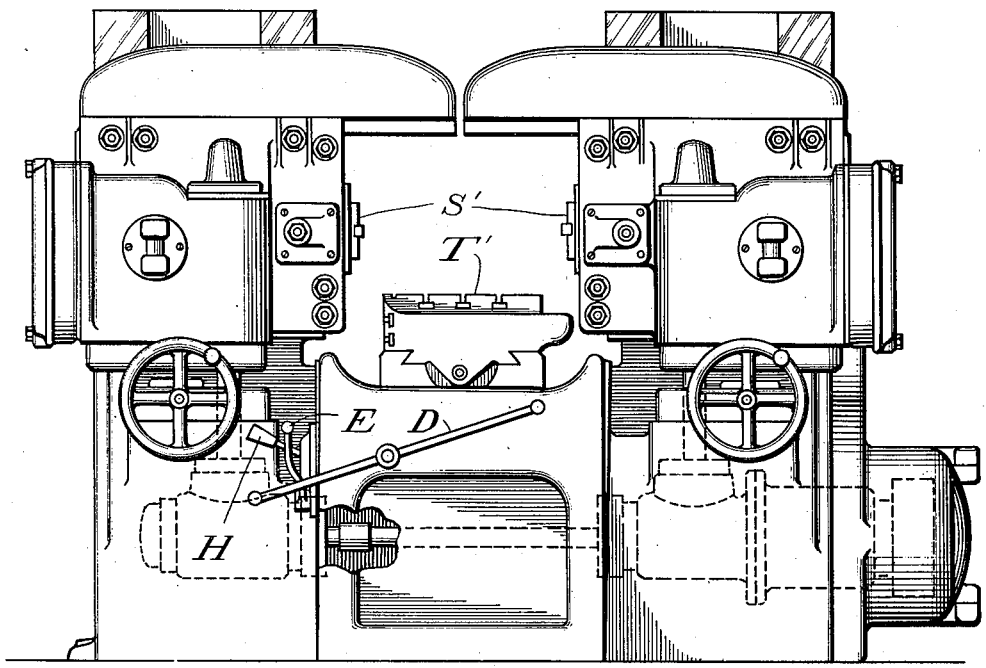
Figure 48:
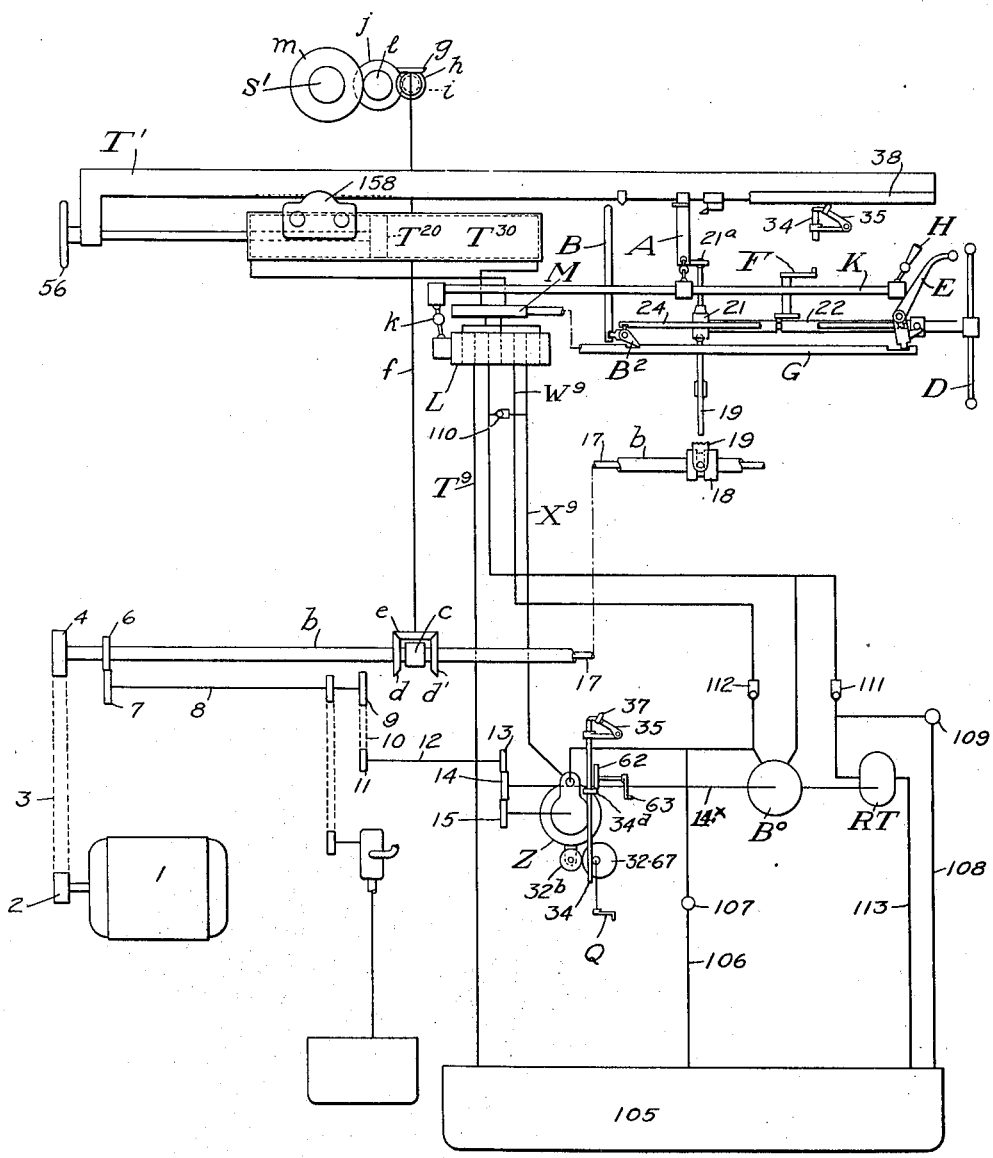

Fig. 18 is a section through the porting for one of the plungers of the booster pump showing how the latter has the added function of a valve. Fig. 19 is an elevation of the trips and manual controls for the main valve and the auxiliary valve showing details of the interlock. Fig. 20 is a detail section through line 20—20 of Fig. 19. Fig 21 is a detail section through line 21—21 of Fig. 19. Fig. 22 is a detail section through line 22—22 of Fig. 19. Fig. 23 is a fragmentary view similar to Fig. 19 showing an interlock connection between the main trip and the shaft which stops and starts the spindle. Fig. 24 is a section through line 24—24 of Fig. 23. Fig. 25 is a vertical section through the main valve showing also the low pressure high capacity rapid traverse pump and its conduit to the main valve. Fig. 26 is a vertical section of the main valve shifted longitudinally to the left from the position shown by Fig. 25. Fig. 27 shows an end of the valve with its stop pin for limiting its extent of rotation clockwise and counter-clockwise. Fig. 28 is a development of the bushing for the main valve and of the particular main valve employed for a one-way feed cycle; the bushing being shown diagrammatically connected with the hydraulic system including the table propelling motor, the sources of fluid, the reservoir and the return to the reservoir. Fig. 29 diagrammatically represents the circuit with the one-way feed cycle valve in its stop position. Figs. 30 and 31 are diagrammatic views of modifications of the system in its stop position and representing the particular valve used for the reciprocating feed cycle and the auxiliary valve for locking the table. Figs. 32, 33, 34 and 35 diagrammatically represent the successive positions in the reciprocating feed cycle where the table goes quickly then slowly to the left followed by quickly then slowly to the right. Fig. 36 is a section through line 36—36 of Fig. 37 and the latter is a development of the particular valve used for accomplishing the reciprocating cycle. Fig. 38 is a section similar to Fig. 36 but showing the valve shifted through one-eighth of a turn. Fig. 39 is a schematic representation of the system as modified for producing a pause at each end of the stroke in a reciprocating cycle. Fig. 40 is a similar representation for producing a pause at one end of the stroke in a one-way cycle. Fig. 41 is a vertical section showing a hand adjustment for moving the table relatively to the piston rod and Fig. 42 is an enlarged detail thereof. Fig. 43 is a section of a hand pump for shifting the piston in the cylinder, representing also its relation to the conduit system. Fig. 44 is a detail thereof. Fig. 45 is a diagrammatic representation of a measuring device for accurately indicating the travel of the table. Fig. 46 is an elevation of said device. Fig. 47 is an end elevation of the entire machine arranged with two spindles and a common drive for each. Fig. 48 is a diagrammatic representation of the entire machine illustrating the preferred embodiment of this invention.

In the bottom of the column which uprises at the rear side of the elongated base on which the table reciprocates, is located a prime-mover here represented as a motor $l$ which is readily accessible through a hinged door as shown by Figs. 3 and 4. The motion is conveyed from the initial pulley 2 through a chain 3 to a pulley 4 secured to a sleeve 5 having a pinion 6 and a clutch member 6'. Beginning at the pinion 6 the transmission extends as a branch line to a hydraulic pumping system utilized for shifting the table as will be explained presently.

This branch line comprises a constantly running pinion 6 meshing with a constantly driven pinion 7 keyed to a shaft 8 which extends from the rear side of the machine, in its base, towards the front side and terminates (as shown by Fig. 4) in a pulley 9 which drives a constantly running chain belt 10 and thereby a pulley 11 keyed to a stub shaft 12 carrying a constantly running gear 13. This gear drives the hydraulic system; to wit, a constant pressure booster pump $B^o$, a rapid traverse pump RT and a variable escapement metering pump Z. The gear 14 is fixed to the shaft $14^x$ of the booster and rapid traverse pumps and is constantly driven from the gear 13 and in turn it constantly drives a gear 15 which operates the variable escapement metering pump. The oil flowing to and from these three pumps passes under the control of certain valves and thereby is caused to shift the table either in one direction or the other and to propel the table at either a feeding or a quick traverse rate; all as will be explained in connection with the controls.

The cutter is rotated mechanically by a transmission train deriving motion from the clutch 6' previously mentioned. Referring to Fig. 5, a clutch element $a$ is keyed to a hollow shaft $b$ on which is splined a reversing collar $c$ which, when shifted to the one side or the other, will clutch the shaft $b$ either to the bevel gear $d$ or $d'$ and thereby drive the bevel gear $e$ either to the right or to the left. The clutch spool $c$ is manually shifted and locked in position by means of a small lever 180 secured to a shaft 181. The lower end of the shaft 181 has a toothed connection with a shifter rod 182 to which is secured a shifter fork 183 and partially encircles the clutch spool $c$. A vertical shaft $f$ is keyed to and leads upwardly from the bevel gear $e$ to enter the casing 160 which carries the spindle and is vertically shiftable on the ways of the column. Splined to the upper end of shaft $f$ is a bevel gear $g$ which, being journaled in said casing, is enabled to be raised and lowered with said casing by virtue of its spline on the shaft $f$. This bevel gear drives a bevel gear $h$ on the shaft $h'$ to which is keyed a pinion $i$ driving a pinion $j$ on a shaft $k$ having a pinion $l$ in mesh with a gear $m$ which, as shown by Fig. 6, has an elongated hub $m'$ splined to the spindle S'.

The above represents the mechanical drive for the spindle and has refinements thereto, there is a means shown by Fig. 6 for shifting the position of the spindle in a longitudinal or axial direction, and there are means shown by Fig. 5 for connecting and disconnecting the spindle from the source of motion, and for quickly arresting its rotation by means of a brake. The shifter for the spindle consists of a turn bolt $1^a$ having a small bevel gear $2^a$ for rotating a bevel gear and worm $3^a$ operating through a rack to shift a non-rotatable but translatable sleeve $4^a$ in which the forward end of the spindle is journaled. A form of mechanism for raising and lowering the spindle is shown in Figs. 8 and 2 and comprises chiefly a screw 170 secured to the spindle casing 160 and a rotatable nut 171 journaled in a bracket secured to the base. Rotation of the nut for elevating or lowering the spindle is accomplished by rotating hand wheel 172, which, through shaft 173 and bevel gear 174 transmit motion to gear 175 secured to the nut 171.

When the friction disks between the clutch members 6' and $a$ are compressed, the spindle is being driven; the compression being accomplished by levers $a'$ actuated by a member 16 which is shifted by a telescoped rod 17. Shifting of the rod 17 in the opposite direction brings the member 16$^a$ into contact with the brake surface 16 to stop the spindle. This rod 17, as well as the shaft $b$ within which it slides, extends from the rear face of the machine to the front face thereof and terminates in a bearing 161 (Fig. 4) in the front wall of the base.

The hand-lever D, at the right side or end of the machine Fig. 2, starts the spindle S' when swung clock-wise, and it applies the brake to stop it quickly when swung counter-clockwise by the user. The mechanical train is as follows: Near the front wall of the base Fig. 4, where the tubular shaft $b$ is journaled, that shaft is slotted to permit the enclosed rod 17 to be connected to a spool 18 slidably carried by the shaft $b$. A short lever 19 pivoted at 20 see Fig. 21 has its lower end in engagement with said spool and is able to shift it forwardly to stop the spindle or rearwardly to start it. This lever 19 has its upper end notched to receive the lower end of a lever 21 keyed to the left end of a shaft 22 which extends longitudinally of the machine and projects beyond the right hand end of the machine where it carries the lever D. Thus, the user, by manually swinging the lever D is enabled to start and stop the spindle manually.

The cutter should not be stationary when the table is feeding because otherwise the work might be jammed against the cutter and cause damage. Therefore an interlock is so arranged that when the lever D is swung counter-clockwise to arrest the rotation of the spindle, a valve (to be subsequently described) is operated to prevent the hydraulic unit from causing the table to feed. This is accomplished by means of a pin 23 see Fig. 19 affixed to a shaft 22 near its right hand end; this pin being in the path of a lug E' projecting sidewise from the lower end of another lever E$^2$ keyed to a short shaft E$^3$ which extends through the front wall of the machine base and has pinned to its exposed end an external hand-lever E located near the right end of the front of the machine. This lever E is so connected with the hydraulic valve system that when it is swung counter-clockwise through a short arc, the feed may function. But it can only be moved into that position when the lever D has been swung clockwise sufficiently to start the spindle, and has thereby withdrawn the pin 23 sufficiently to permit the lug E' to move counter-clockwise. Any movement of the lever D counter-clockwise (which stops the spindle) will cause the pin 23 to force the lug E' and swing the lever E clockwise with the effect that the feed will stop.

Sometimes it is desirable to have the cutter continue to rotate although the feed has been disconnected, as for example, in finishing an arcuate recess. This may be done by moving the lever E through a short arc clockwise; in which case the lug E' merely withdraws away from the pin 23 without turning the handle D or the shaft 22 in a direction to stop the spindle.

Reference heretofore has been made solely to certain manual controls. These, however, have been so designed that they admit of being automatically operated. Projecting upwardly from the base and located adjacent the front longitudinal edge of the shiftable table is a mechanical trip A in the form of a plunger. This may occupy four different positions. It may be axially uplifted or depressed, or it may be partially rotated clockwise or counter-clockwise beyond a neutral position. These four different positions, are, through connections to be described, communicated to a main valve associated with the hydraulic unit. Also, when rotated counterclockwise, the spindle and cutter are set in motion. At the lower end of the plunger A is a bifurcation A' see Fig. 24, one arm (A$^2$) of which is the longer and projects into the path of a finger 21$^a$ extending from the shaft 22. These parts are so proportioned that a partial rotation of the plunger A counter-clockwise will cause the member A$^2$ to swing the finger 21$^a$ and turn the shaft 22 clockwise and start the spindle. The reason the fork A' has one tine longer than the other is because it is not always desirable that a rotation of the plunger A clockwise shall automatically arrest the rotation of the spindle. It will do so when the finger 21$^a$ lies between the tines of the fork. But the shaft 22 may be set manually (by swinging the small finger lever F) through 180° and this will shift the finger 21$^a$ to the right sufficiently so that it is within the path of the tine A$^2$ only. With this setting, the plunger A may obviously be partially rotated clockwise without imparting motion to the shaft 22 and without stopping the spindle.

An automatic trip for stopping the feed is indicated by B Figs. 1 and 19. This is a plunger rod normally held uplifted by a spring and located at the front edge of the table near the aforesaid plunger A. When a dog adjustably mounted on the table approaches the plunger rod B either from the left or from the right, as may be, it depresses that rod causing it to swing counter-clockwise a short lever B' having a pawl B$^2$ normally holding a stop rod G in its inoperative position. A depression of the plunger rod B will free the pawl B$^2$ from the stop rod G; permitting the spring G' to shift it to the left to its stopped position if its movement is not otherwise obstructed by the projection E$^4$ associated with the lever E. However, a rod 24 has a close notched fit with the short lever B' and a sufficiently loose fit with the arm E$^2$ associated with the lever E to permit the pawl B$^2$ to be readily disengaged from its notch. The spring G' then pushes the stop rod G to the left and swings the hand lever E clockwise. The user can subsequently grasp this hand lever to swing it counter-clockwise to restore the parts to their previous condition. Conversely, by manually swinging the lever E clockwise, the connecting rod 24 is shifted to the left and the pawl B$^2$ is raised clear of its notch so that the spring G' may shift the stop rod G to the left as fast as the finger E$^4$ is moved to the left by the manual operation of the lever E. Thus the feed will be stopped under each of the following conditions: (1) When a dog moving to the left depresses the plunger rod B; (2) when a dog moving to the right depresses the plunger rod B; (3) if the operator turns the lever E clockwise; (4) if the operator turns the lever E counter-clockwise and (5) if the plunger A is turned clockwise when the finger lever F has been set to its left side but not when it has been set to its right side.

The effect on the valve system of shifting the plunger A into either one of its four different positions may now be investigated. These four positions are attainable automatically by appropriate dogs adjustably arranged on the front edge of the table or by the universally mounted hand lever H, which is arranged at the front wall of the machine near its right hand end.

The plunger A and the hand lever H are each connected by a ball and socket joint with a long rod K which extends from one end of the machine to the other; being in turn connected at its left end through a ball and socket link k' with a main control valve L. This, accordingly, may be set into either one of four different positions depending upon the shift given to the pilot A or the handle H as the case may be. The valve L may thus be set to the left or to the right or swung clockwise or counter-clockwise These four positions yield all the combinations of rates and directions of movement required for such cycles as are required in various milling operations; an auxiliary supplemental valve M (operated by the stop rod G previously described) being in certain cases required i. e. for a so-called "reciprocating feed" cycle.

Before detailing the manner in which the main valve diverts the flow of the fluid, it should be noted that, wholly unlike conventional systems, the advance of the piston that propels the table is governed by the rate of escapement rather than by the rate of admission of the oil. There are two sources of oil; the large capacity low pressure source for economically effecting rapid traverse movements where no resistance is offered by the tool, and a low capacity high pressure source for effecting a movement at a feeding rate against great opposition. This opposition is a result of a heavy back pressure where the oil is retained by a metering device in advance of the piston plus or minus a force exerted by the cutter depending upon whether it is rotating with or against the direction of the travel, as the case may be. The direction of the cutter is determined by the setting of the reversing clutch previously described so that it may be run in the usual and customary manner opposite to the direction of the feed, or with the feed. The peculiar character of this proposed hydraulic system enables the cutter to be run with the feed with entire success, it being impossible, by reason of the heavy opposed hydraulic pressures for the cutter to cause an over-running of the table. The table is held vise-like under the differential control of the high pressure source and the metering escapement. The pressures are powerful and by this is meant a magnitude comparable with the maximum cutting force of a high duty cutter. In the case of a present day milling cutter in a 15 H. P. machine, this may be exemplified as attaining in the neighborhood of five tons and if the cutter be rotated against the feed, the constant urge will be of a sufficiently greater magnitude to result in a feeding of the table at the positively uniform rate insured by the conversely acting hydraulic effort. This opposed system puts into unique effect a latent characteristic of the oil; to wit, a very slight yet perceptive resiliency which, under what may be termed opposite compression, affords a dampened yield and retarded recovery which is ideally compatible with refined tooling requirements. Consequently, the pronounced chatter caused by the inevitable back-lash in purely mechanical feeds, as well as the hammer-like vibrations attributable to the torsional resiliency of a long screw or shaft, are not exhibited in this hydraulic opposed system.

Deferring the explanation of the details of the three pumps and, for the present, considering the main valve it is in the general form of a cylinder having its periphery provided with a diversity of longitudinal extending slots. The number, relationship, and proportions of these slots will be arranged compatibly with the cycle or cycles desired by the user of the machine. This valve element admits of being very easily removed and replaced by another suitably configurated. The casing or housing for this valve element is so designed that it need not be interchanged when a modified valve element is substituted. For example, the casting N forming part of the bed (Fig. 26) is bored to receive a bushing O diversely perforated and channeled to provide a diversity of ports. Thus, it has seven peripheral grooves S, T, U, V, W, X and Y; Fig. 25. The channels S and Y each communicate through appropriate conduits 162, 163 and 164 as shown diagrammatically by Fig. 37 with the left end of the cylinder $T^{30}$, and the channel V with the right end of the cylinder. The channel U through line $U^9$ etc. shown by Fig. 37 receives and is always filled by a copious flow from the rapid traverse pump. When this flow is not being used to actuate the piston $T^{20}$ and table propelled thereby, it is, through the agency of the valve element L, freely in communication with channel T which through a suitable conduit $T^9$ leads to the reservoir. If the table is to be traversed rapidly to the right, the channel U is put into communication with the channel S leading to the left end of the cylinder, and if the table is to be traversed rapidly to the left the channel U is put into communication with the channel V which is conduited to the right end of the cylinder. The channel W is always in communication with and receives a relatively low flow of oil under high pressure from the variable escapement pump Z supplemented by the booster pump $B^0$. Channel X is conduited to the inlet end of the variable escapement pump and when a rapid traverse is being effected the valve element connects channels W and X to permit the idling of the high pressure oil. When the feed takes place, however, channel W is connected either with channel V or with channel Y depending upon whether the table is to be fed to the left or fed to the right.

To accomplish these communications the channels are provided with an arrangement of ports. These are clearly shown in the diagrammatic views, Figs. 28 and 37, and occupy positions defined by longitudinal and polar coordinates. The channel S has ports designated $S^2$, $S^3$, $S^6$ and $S^7$. The channel T has ports designated $T^0$, $T^2$, $T^4$ and $T^6$. The channel U has ports designated $U^0$, $U^3$, $U^4$ and $U^7$. The channel V has ports designated $V^0$, $V^2$, $V^4$ and $V^6$. The channel W has ports designated $W^0$, $W^3$, $W^4$ and $W^7$. The channel X has ports designated $X^0$, $X^2$, $X^4$ and $X^6$. The channel Y has ports designated $Y^0$, $Y^3$, $Y^4$ and $Y^7$. In the polar planes 0, 1, 2 and 3 the ports are duplicates of and complementary to the ports in the polar planes 4, 5, 6 and 7, the purpose of this being to double the effective areas and render the arrangement of conduits more convenient and to provide a balance of pressure upon the valve element L.

It will be seen that the function of the valve element L is to appropriately bridge these ports so as to direct the flow according to the needs. This valve accordingly has a series of bridging slots, referred (Fig. 25) to generally as L', supplemented by bores $L^2$. The geometrical relationship of these bridging slots can best be grasped by referring to Fig. 28 of the drawings which show the development of the periphery of the particular valve element L⁰ compatible with a one-way feed cycle in which there is a rapid traverse followed by a feed and then followed by a full return at a rapid traverse rate, and then a full stop with the table locked. The drawings also show (Fig. 37) a development of a modified valve element L compatible with a reciprocating feed cycle in which there occurs a rapid traverse to the left followed by a feed to the left and then a rapid traverse to the right followed by a feed to the right; all in repeating cycles. In this case the auxiliary valve M is employed for the purpose of effecting a stoppage of the movement.

It may here be noted that the novel valve constructions disclosed herein is compatible either with a conventional hydraulic system (where the feed is not governed by an escapement control but by the rate of admission) or with the unique system herein revealed wherein there are, during the feed, opposed pressures and the rate of feed is governed solely by a volumetrically constant escapement. Since the valves have been shown in combination with the new system, it will be well, therefore, to consider the relations of the return ports.

When any return port (series T) is connected to the left end of the cylinder through a port of series S, there will be no opposition to the movement of the piston to the left and the table will travel rapidly to the left. If connected to the right end of the cylinder (through series V) the table will traverse rapidly to the right.

When any return port (series X) is connected to the left end of the cylinder through a port of series Y, oil will at a volumetrically constant rate be metered out and the piston and table will feed to the left; its rate of feed being determined by the adjustment of the meter Z. If connected to the right end of the cylinder (through any port of series V), the table will feed to the right.

Figure 35:
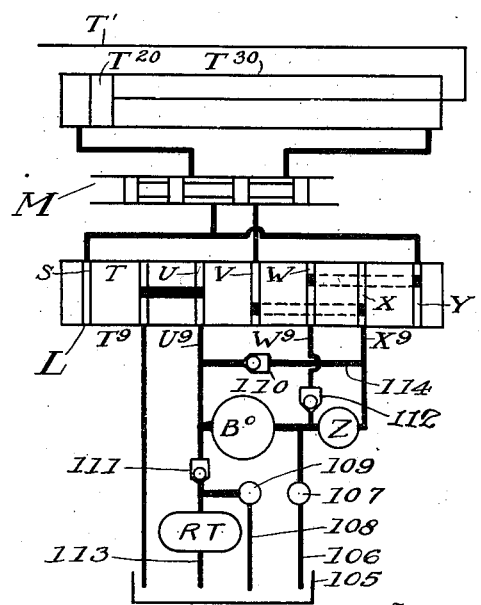

In the case of the valve L for the reciprocating feed cycle (shown in section by Figs. 25 and 26) a feed to the right ensues when it is positioned as shown by sectional Fig. 25 and diagrammatically by Fig. 35. Now if the valve be shifted longitudinally to the left all the way without any rotation it will occupy the position shown by Fig. 26 and the direction will be reversed and the table will move to the left at a rapid traverse speed as diagrammed by Fig. 32. If now it be turned clockwise 45° without shifting it axially, a feed to the left will result, as shown in diagram by Fig. 33, and if it then be shifted to the right without any turning a rapid traverse to the right will result as shown diagrammatically by Fig. 34. It will be observed that all of the four positions of an eighth turn combined with a one zone shift yield no stop and, unless more than an eighth of a turn be given it, it becomes necessary to employ an auxiliary stop valve M as shown by Figs. 19, 30 and 31. This is not the case when the main valve assumes the modified form L⁰ adapted for a one way feed cycle for, in the latter case, its fourth position stops all flow to or from the motor and locks the table.

In the reciprocating feed cycle the table is traversed to the left and then to the right as heretofore explained and as it reaches its starting position on its return stroke the main valve L is moved to the rapid traverse forward position and the cycle is repeated. This valve has four positions, not one of which effects a stopping of the flow of oil to and from the cylinder, therefore, the auxiliary valve M is employed in the system. This valve is located between the main valve L and the cylinder T³⁰, and is normally in the position indicated in Fig. 37, that is, permitting a flow of fluid to and from the cylinder. Now, if the stop valve M be moved to the position indicated in Fig. 31, conduit 164 is connected with the conduit leading to the channel V of the main valve, and the fluid therein merely circulates. The conduit leading from the left end of the cylinder and also the conduit from the right end are effectively blocked in the auxiliary valve M and the table is locked in position, no fluid being allowed to enter or leave the cylinder T³⁰.

The stop valve M may be automatically actuated by the movement of the plunger rod B, or manually actuated by moving lever D counterclockwise, or lever E clockwise, as heretofore explained.

In the case of the one way feed cycle valve L⁰, the diagram of Fig. 28 shows how a rapid traverse to the left will be attained. Shifting that valve to the right will close all ports to and from the hydraulic motor and will lock the table as indicated in Fig. 29.

It is a matter of importance that the table shall admit of being locked against all possibility of movement to prevent any shift of the work due to contact with the cutter. When so locked, it may however in either case be shifted manually by the agencies now to be described.

In addition to the hydraulically actuated and automatically controlled feed device for the work table, this invention also provides improved manually actuated feed therefor by means of which relative movement between the tool and the work may be effected and controlled with great accuracy. A device of this nature is particularly useful for effecting an initial positioning of the tool and work and also to feed the work table when it is desired to machine to a line with great precision. Fig. 43 discloses a manually actuated auxiliary pump and valve mechanism which readily may be combined with the hydraulically actuated and automatically controlled table feed hereinbefore described. This manual feed comprises a combined pump and valve casing R within which is rotatably journaled a short shaft 39 having secured to its outwardly projecting end a hand crank R'. Intermediate its ends, the shaft 39 is provided with an eccentric 39ª which serves as the actuating element for two opposed pumps R² and R³ of unequal capacity. The eccentric may consist of a unitary element but preferably it will comprise two parts, one the eccentric proper and the other a suitable wear ring surrounding the eccentric element. The pump R² comprises a cylinder 40 formed in the casing R and a piston 41 slidingly fitted therein, the inner end of the piston engaging the periphery of the eccentric 39ª and receiving outward reciprocatory motion therefrom. The outer end of a cylinder is closed as by a cap screw 41ª and a coil spring 41ᵇ, interposed between the screw and the piston, exerts an inward pressure on the piston maintaining it in contact with the eccentric and causing the piston to be retracted as the periphery of the eccentric recedes. The pump R³ comprises a cylinder 42 also formed in the casing R, a piston 42ª operable in the cylinder by means of the eccentric 39ª and a coil spring 42ᵇ which functions the same as the spring 41ᵇ. A cone valve R⁴ for controlling the intake and exhaust of the cylinders 40 and 42 is fixed to the shaft 39 and rotates synchronously with the eccentric 39ª. This valve includes disconnected arcuate ports 43 and 44 which overlap in the direction of the axis of the valve as shown in Fig. 43. The valve casing is formed, at one side, with three parallel ports 45ª, 45ᵇ and 45ᶜ and a transverse duct 45ᵈ connected with the cylinder 40, and at the opposite side with three ports 46ª, 46ᵇ, and 46ᶜ and a transverse duct 46ᵈ connected with the cylinder 42. A coil spring 47 interposed between washers abutting the eccentric 39ª and a flanged bushing 48 secured within the casing serves to maintain the cone valve in its conical seat. The pump R² serves, upon rotation of the crank R', in the direction indicated by the arrow $t$, in Fig. 43 to withdraw measured amounts of fluid from the right end of the feed cylinder T³⁰. During this pumping action the fluid flows from the feed cylinder, through pipe line 49, through ports 45ᶜ, 44, 45ᵇ and duct 45ᵈ into the cylinder 40 during the intake stroke of the piston 41. Upon rotation of the crank R' and the eccentric 39ª to effect exhaust movement of the piston 41, the valve R⁴ is rotated to bring the ports 43 and 44 into the position shown in full lines in Fig. 43. This affords passageway from the cylinder 40, comprising the duct 45ᵈ, ports 45ᵇ, 43 and 45ª, through which the fluid is ejected into a pipe line 51 from which it is exhausted. Simultaneously with the action of the pump R², the pump R³ acts to draw fluid, in measured amounts, from any suitable source, such for example as the exhaust line of the rapid traverse pump RT, and injects it into the left end of the feed cylinder, thereby causing the piston and the work table connected therewith to be shifted to the right. Upon retraction of the piston 42ª, fluid is drawn into the cylinder 42, through a pipe line 52, ports 46ᶜ, 44, 46ᵇ, and duct 46ᵈ. Upon rotation of the eccentric 39ª to depress the piston 42ª the valve R⁴ is moved to bring the port 43 into the position shown in dotted lines and as the piston is depressed the fluid within the cylinder is exhausted through the duct 46ᵈ, ports 46ᵇ, 43, 46ª, and through pipe line 53 into the left end of the feed cylinder.

Upon rotation of the crank R' in the direction reversed to that just described, the pumps R² and R³ operate in a reverse manner thereby withdrawing fluid from the left end of the feed cylinder and injecting the fluid into the right end thereof, thus causing the piston and the work table connected therewith to be moved toward the left.

To insure that the table will be moved at uniform speeds in opposite directions, the pistons 41 and 42ª preferably are formed of sizes bearing the same ratio as the effective cross sectional areas of the two ends of the feed cylinders which, it will be perceived, are unequal due to the fact that one end of the feed cylinder contains the piston rod.

This invention also contemplates the use of a mechanical manually actuated table adjusting means. As shown in Figs. 41 and 42 this may comprise an adjustable connection between the piston rod and the work table. This adjustable connection may consist of a nut 54 rotatably journaled in a lug formed on the work table, said nut having a threaded engagement with a screw 55 forming a part of the piston rod.

A hand wheel 56, attached to the nut, affords convenient means for rotating the nut. It is to be remembered that the piston and the piston rod are, in effect, clamped within the feed cylinder by the opposed fluid pressure in the cylinder at the opposite sides of the piston. Therefore, rotation of the nut on the screw will cause the nut to be translated thereby carrying with it the work table.

The variable escapement metering device Z which regulates the rate at which fluid is ejected from the feed cylinder T30 may be of any suitable or desired construction. There is shown in Figs. 10, 11 and 12, one form of device which accomplishes this result satisfactorily. This device consists of a variable displacement pump of that type comprising a rotating cylinder block 30 provided with a plurality of radially disposed cylinders within each of which is slidingly fitted a piston 30'. A rotatable casing element 31 fixed to a shaft 15ˣ driven by the gear 15 surrounds the piston block and is formed with an annular wall adapted to engage the outer ends of the pistons. When the axis of the cylinder block and the axis of the casing element are arranged eccentric to each other and the cylinder block is rotatable the wall 31ʷ of the casing element alternately forces inwardly on the pistons 30' to eject from the cylinder the fluid which previously had been admitted thereinto during outward movement of the piston. When the axes of the cylinder block and the casing 31 are concentric the pump pistons are maintained non-reciprocable and pump displacement is at zero. It will therefore be perceived that the rate of delivery of the metering device is determined by the relative positions of the axes of the cylinder block 30 and the casing 31. To provide for varying the relative positions of these two elements thereby to vary the rate of pump delivery, the cylinder block is supported by a rock arm 30ª journaled upon a pintle 30ᵇ fixed in the casing P.

A feature of this invention resides in the provision of means for automatically changing the effective action of the metering device during uni-directional movement of the work table whereby the table may be caused to move at varying rates to provide a feeding rate best suited for machining a work piece having a surface of varying area. To that end there is journaled within the casing P a shaft 32ª and upon which is secured an eccentric 32 which engages a wheel 32ᵇ carried by the free end of the rock arm 30ª. A plunger rod 34 reciprocable in bearings 34ª and 34ᵇ carries a rack which meshes with a pinion 33 on the shaft 32ª. A coil spring 34ᶜ interposed between the bearing 34ª and a collar 34ᵈ on the plunger rod normally serves to elevate the plunger rod and thereby rotate the pinion 33 and eccentric element 32 to a position wherein it puts the arm 30ª under the action of spring 32ᶜ to be moved to a position in which it effects maximum pump displacement. Upon the reciprocating work-table T' there is secured a cam 60, the face of which engages the upper end of the plunger rod 34. Upon reciprocation of the table, the cam will act to depress, and to permit to elevate, the plunger bar 34 which through the parts previously described will effect the swinging movement of the arm 30ª to increase or decrease the eccentricity of the cylinder block 30 with respect to the casing 31. thereby to vary the effective action of the metering device and consequently varying the rate of table feed. It is to be understood that the cam 60 will be formed in accordance with the form and nature of the work piece to be machined and that this feed regulator will be used primarily for quantity production.

Manual means is provided for throwing out the automatic control for the variable displacement pump. This means comprises a shaft 61 journaled in casing P and an eccentric 62 affixed thereto and engaging the upper side of the collar 34$^d$. A crank 63 affixed to the outer end of the shaft 61 serves to rotate the shaft and eccentric either to the position shown in Fig. 10 in which the eccentric acts upon a collar 34$^d$ and depresses the plunger bar 34 to its maximum extent or 180° therefrom which permits the plunger 34 to move upwardly to its maximum extent. A spring pressed plunger pin 64 carried by the crank 63 is adapted to be inserted in either one of two apertures 65 provided by the casing P.

A manual adjustment of the variable escapement pump Z is also provided for varying the feed rate. This comprises a shaft 66 journaled in the casing P, in alignment with the shaft 32$^a$, and an eccentric element 67 secured thereto adjacent the automatically actuated eccentric 32 previously referred to. The eccentric 67 also engages the wheel 32$^b$, and upon rotation of the shaft 66, acts to swing the arm 30$^a$. A hand crank Q fixed to the shaft 66 affords means for rotating the shaft, and a spring-pressed pin 68, carried by the crank, is adapted to enter any one of a plurality of apertures 69 provided in the casing P, thereby to maintain the parts in any desired position of adjustment. It is to be understood that this manual control will be used when the automatic control, including the cam 60, is rendered ineffective by the action of the feed throwout above described.

No attempt has been made in the way of a detailed description of the booster pump, the same forming the subject matter of a co-pending application.

It will readily be perceived that where a piston (movable in a hydraulic cylinder) is mounted upon one end of a piston rod extending into the cylinder, introduction of a predetermined amount of fluid into the end of the cylinder containing the rod will effect a greater movement of the piston than will a similar amount introduced into the opposite end. This variation is due to the displacement caused by the piston rod and the amount of variation is proportionate to the volume of the rod in the cylinder. The converse obtains when fluid is removed from the cylinder to permit movement of the piston under pressure exerted on the opposite end of the piston, as proposed by this invention.

In the type of machine tool illustrated it is highly desirable that the rate of feed of the work table be uniform regardless of its direction of movement. To that end, this invention proposes a simple yet effective compensating mechanism which automatically varies the effective action of the metering device upon each reversal of the work table, whereby it becomes less effective when removing fluid from the end of the cylinder containing the piston rod and proportionately more effective when removing fluid from the opposite end of the cylinder. (See now Figs. 10, 11, 12, 13 and 14.)

As hereinbefore explained removal of measured quantities of fluid from the cylinder is effected by means of a metering escapement which conveniently may consist of a variable displacement pump Z and the effective action thereof is determined by the position of the cylinder block 30 relative to the piston actuating casing 31. It has also been explained that the cylinder block 30 is supported by an arm 30$^a$ pivoted upon the pintle 30$^b$ and that the effective action of the pump is varied by swinging the arm about its pintle. An eccentric member 32 fixed upon a shaft 32$^a$ engages a wheel 32$^b$ on the arm 30$^a$ and acts, upon rotation of the shaft in one direction, to shift the arm 30$^a$ laterally. A spring 32$^c$ acts in opposition to the eccentric member and shifts the arm in the opposite direction when the eccentric is rotated to withdraw its periphery from the wheel 32$^b$. To effect rotary motion of the shaft 32$^a$, and the eccentric 32, the shaft is provided with a pinion 33 which meshes with rack teeth formed on a vertically reciprocating plunger bar 34 slidable in bearings 34$^a$ and 34$^b$. A coil spring 34$^c$ interposed between a collar 34$^d$ on the plunger bar and the bearing 34$^a$ normally tends to move the bar upwardly, thereby to increase the effectiveness of the variable delivery pump.

To render the intake of the pump proportionate to the effective cross sectional area of the end of the cylinder being exhausted, a lever 35 is pivoted at 35$^a$ to a bracket 36 which forms the upper bearing for the plunger rod. The free end of this lever rests upon the upper end of the plunger rod 34. Intermediate its ends, the lever has pivoted to it a pawl 37 having a nose 37$^a$ frictionally engaging a bar 38 carried by the work table T' of the machine, which table, as previously described, is given feeding movements, in reverse directions, hydraulically. Feeding movement of the table, in the direction indicated by the arrow $x$ in Fig. 14, is effected by admitting fluid under pressure into the end of the cylinder opposite to that containing the piston rod and successively withdrawing from the end of the cylinder containing the piston rod measured amounts of fluid. Thus it will be observed that to maintain a uniform feeding rate during this movement, effective action of the variable displacement pump should be reduced. This is effected by the action of the pawl 37 and the lever 35. As the table starts to move in the direction of the arrow $x$, frictional contact between the bar 38 and the nose of the pawl 37 causes the latter to be tipped about its pivot, from the position shown in dotted lines Fig. 14 to that shown in full lines, thereby depressing the lever 35, as shown in full lines, and likewise the plunger rod 34, which, as previously explained, will cause the pump cylinder block to be shifted toward the center of the pump casing, thereby reducing pump displacement. Likewise when fluid pressure is admitted into the end of the feed cylinder containing the piston rod and the metering pump Z is connected with the opposite end, the table T' will be moved in the direction indicated by the arrow $y$ which will cause the pawl again to be shifted to its dotted line position, whereupon the lever 35 and the plunger rod 34 will be permitted to rise under the influence of the spring 34$^c$ and the action of the variable pump will be increased.

The bar 38 is preferably made vertically adjustable on the table T, as by means of screws 38$^a$ passing through vertical apertures 38$^b$ in the bar, to permit the bar to be set to any desired elevation thereby to regulate, initially, the position of the plunger rod 34, and consequently the rate of table feed, as may be desired for any particular piece or class of work.

The diagrams showing the source of the oil and the principles of the hydraulic system may now be understood. Referring to the various diagrams and particularly to diagram 29, the oil is delivered by the hydraulic system to the main valve L⁹ copiously and under low pressure through the conduit U⁹, and at a low capacity high constant pressure through the conduit W⁹. The escapement at a volumetrically uniform rate occurs through the p'pe X⁹; these two last mentioned pipes leading respectively to the outlet and intake of the variable metering escapement pump Z. This might well discharge directly into the reservoir 105 because it is not primarily intended to maintain the high constant pressure in line W⁹, but it is of advantage so to do. The oil so delivered into the conduit W⁹ is supplemented by a small quantity under a high pressure from booster pump B⁰, which draws its supply from the line U⁹ which receives a copious flow under low pressure from the rapid traverse pump RT; the latter getting its supply through the pipe 113 leading from the reservoir 105. It may happen, at times, that the feed of the table is arrested, either by a fixed stop as previously described, or by the excess resistance of the cutter and to provide an outlet in such circumstances for the surplus oil being fed into the line W⁹, a high pressure relief valve 107 is arranged in a return branch line 106.

There are occasions when the feeding of the table is resisted and the back pressure in the return line X⁹ may thereby fall to a low value and the metering pump Z would not be properly fed with oil. To prevent that circumstance, a shunt line 114 extends from the outlet side of the rapid traverse pump line and leads to the return line X⁹, and in this shunt line is a check valve 110; this valve permitting no flow from the feed line to the rapid traverse line but permitting a flow in the contrary direction when the pressure in the feed line unduly diminishes. As shown by Fig. 30, it is desirable also to have a check valve 112 in the discharge line from the variable displacement pump; especially when the discharge from that pump is used to supplement the feeding pressure from the booster pump instead of discharging immediately to the reservoir.

Inasmuch as the rapid traverse pump may, at times, deliver a more copious quantity of oil than will be taken by the system, a low pressure relief valve 109 in the nature of an emergency relief is provided in a branch circuit 108 extending to the reservoir from the outlet conduit from the rapid traverse pump and to prevent any reversal in flow when a cutter causes a pressure in excess of the supply pressure, a check valve 111 is located as shown by the diagrams.

For pause milling the modification diagrammatically represented by Figures 39 and 40 are proposed. The shifting of the main valve L longitudinally to effect a reversal at a rapid traverse rate is done hydraulically instead of by a mechanical trip associated with the table. This is because the reversal is not to be effected until an appreciable interval after the table has been brought to a full stop. The object of having a pause is to enable a cutter to run in contact with the work during a non-feeding interval so that it may impart a finer finish to the work than results when it is feeding. For instance, when forming half bearings 75 and 76 mounted on appropriate brackets bolted to the respective ends of the table T', the cutter will first feed into the castings to shape the semi-circular seats 77. After the required depth of the cut has been attained, it is desired that the translation of the table should be entirely discontinued while the cutter is still in engagement with the work and that the cutter should continue to run without any feeding for an appreciable interval when in this position so as to eliminate all feed marks and produce the highly finished surface analogous to a reamed surface. The translation of the table is arrested positively by the abutment of an adjustable stop 78 either against a corresponding lug 79 carried by the support for the spindle, or by a lug 80 affixed to the bed of the machine as indicated by Fig. 40. When this contact is established it is manifest the hydraulic effort will be unable further to advance the table and this insures that the table should stop at a very exact point and will remain in that stopped position until the main valve is reversed.

The shifting of the main valve is accomplished hydraulically in this instance by means of an auxiliary piston 81 within an auxiliary cylinder 82. The piston rod 83 has a pin and slot connection 84 with a lever 85 adapted to swing about a fixed pivot 86; the upper end of this lever being pivoted, having a ball and socket pivoted at 87 with the shift rod K which controls the position of the main valve L that has been previously described. Things are so arranged that the piston 81 will not swing the lever 85 until at the end of a predetermined interval after the table has ceased to advance. This is done hydraulically; taking advantage of the fact that the pressure between the metering escapement pump Z and the advancing side of the main piston T²⁰ which moves the table will drop to a low pressure. It will be remembered that during the feeding stroke a high constant pressure is maintained in one end of the cylinder T³⁰ and this pushes the piston T²⁰ toward the other end of the cylinder and forthwith raises and maintains the pressure to a high magnitude; the advance of the piston T²⁹ being permitted only by the volumetrically constant release of oil from the end of the cylinder then connected with the metering escapement pump. But if the piston be restrained from advancing by the mechanical stops mentioned, then it will cease to exercise pressure against the oil ahead of it and since the metering pump is constantly operating, the pressure will forthwith drop to a low point. This diminution in pressure is utilized to switch oil into the cylinder 82 behind the piston 81 and cause the latter to move the lever 85 in the following manner.

A conduit 88 leads from a high constant pressure side of the main hydraulic system to the port 89 in the casing of a spring valve 90. This valve is normally shifted against the opposition of a spring 91 by virtue of the then existing high pressure in the conduit 92 deriving its fluid from between the metering displacement pump and the end of the cylinder then in communication with it; this conduit leading to an always open port 93 at one end of the valve 90. This is the condition of the parts during a feeding stroke when the pressure is high in the conduit 92. When that pressure drops due to the mechanical arresting of the table, the spring 91 becomes effective to shift the valve 90 to the left. Thereupon port 94 is opened and oil is permitted to flow through the throttle valve 95 which is manually adjustable to determine its rate of flow. The slower it flows the longer will be the pause and conversely. After passing the throttle valve the oil goes to the ports 96 and 97 of a reversing valve 98 with which the lower end of the lever 85 has a lost motion connection indicated at 99. When the valve is positioned as shown by Fig. 39 the oil flows through the port 100 and thence into the left hand end of the cylinder 82. This forces the piston 81 to the right and the rod K is translated and thereby the main valve L is longitudinally shifted. This consumes an interval of time depending upon the adjustment of the throttle valve 95 and ultimately the main valve L will be moved into its reversing position and the table will then start on its quick traverse return.

In the meantime the lower end of the lever 85 will have taken up its lost motion and will have shifted the valve 98 to the right. This produces no immediate effect but it conditions the valve 98 for admitting oil to the other side of the cylinder 82 when the table has been arrested at the end of its return stroke by means of the fixed stop 78', i. e. when the cutter is starting to finish the work 76. It should be mentioned that as soon as the feeding begins towards the end of the return stroke the back pressure and the conduit 92 again rises and again shifts the valve 90 to compress the spring 91 and the parts are in position for performing another pause operation.

The oil escaping from the cylinder 82 either through the conduit 100 or 101, as the case may be, passes through the conduit 102, into the chamber 103 and then through the conduit 104 into the reservoir 105. Any excess high pressure oil beyond the throttle valve 95 or leaking into the system through the port 94 is permitted to drain through the branch 104, the port of which is open to the chamber 103 when the valve 90 is compressed against its spring but is closed as soon as the spring has become effective to shift the valve to the left.

When there is no necessity for operating the table continually in a reciprocating cycle (fast and then slow to the left, and fast and then slow to the right, and so on) the system shown by Fig. 39 may be simplified into the form shown by Fig. 40 where but one fixed stop is used for arresting the feed of the table only in one direction; the cycle being merely a one-way feed, to wit, quick traverse followed by feed and then a full length reverser at a quick traverse rate. In this case the main valve L⁰ has the form previously described for a one-way feed cycle and there is no need for the auxiliary stop valve indicated by M on Fig. 39 nor the direction reversing valve indicated by 98 on Fig. 39. The restoration of the main valve L⁰ and of the rod K are effected manually by the operator for the renewal of each single cycle. In this instance, the same spring valve 90 may be used in conjunction with similar conduits 92, 88 and 104. The lever 85' in this instance has no extension to a reversing valve and, instead of having a ball and socket connection with the rod K it merely bears against a collar 87' to provide lost motion so that after the lever 85' has moved the rod K it may then freely return to its normal position leaving it to the user to restore the rod K to its normal position manually. When the adjustable dog contacts with the fixed stop 80, and the pressure consequently drops in the line 92, the high pressure in the line 88 will be transferred from the right side of the piston 81 to its left side (the spring 91 shifting the valve 90) and the high pressure fluid will flow through the adjustable throttle 95' to shift the piston 81 to the right and move the valve L⁰ into its quick traverse reversing position. When the piston 81 is moving to the right, the fluid ahead of it will drain to the reservoir through the conduit 104 and when the table has reached the end of its return rapid traverse stroke, the lever 85', the piston 92 and the valve 90 will be restored to the position shown by Fig. 40.

In mechanically driven work supports, the ultimate propelling agent is usually a nut and screw, or a rack and worm, so ratioed that a considerable angular motion of one of the elements corresponds positively to a comparatively small linear movement of the other. Consequently, the angular movement of the one may be referred to as a measure of the travel of the table. But, as the revolutions of a hydraulic pump cannot be used as an accurate measure of the travel of the table, and as the piston moves as a unit with the table, this convenience of a mechanical drive is absent from a hydraulic drive.

To overcome this difficulty, the construction disclosed by Figs. 45 and 46 may be resorted to. A rack 150 is secured to the longiutdinal edge of the table. With this is engaged and thereby driven a gear 151 of a clock-train comprising a gear 152 so ratioed in the train that one revolution thereof corresponds exactly to a predetermined length of travel of the table. The axle of this gear 152 carries a pointer 153 cooperating with a ring of graduations 154 from which the travel in inches of the table may accurately be read. Likewise there is another pinion 155, pointer 156 and scale of graduations 157 for indicating the travel in thousandths of an inch.

These parts are conveniently housed in a box 158 affixed to the bed of the machine.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, we claim as new and desire to secure the following combinations and elements, or equivalents thereof, by Letters Patent of United States:—

1. A machine tool combining a work support and a cutter support; hydraulic means for propelling one of said supports; a valve element for determining the effect of said means, said element being rotatable and translatable; and trip mechanism actuated by said propelled support adapted to rotate or to translate said element.

2. A machine tool combining a work support and a tool support; hydraulic means for propelling one of said supports; a mechanically driven metering escapement for volumetrically controlling the return of fluid from said system; and a trip device automatically actuated by said propelled support for effecting a slight adjustment of said metering escapement.

3. A machine tool combining a work carrier; a tool carrier; a reciprocator for one of said carriers comprising a cylinder; a piston and a rod extending from one side of said piston; means for forcing oil into said cylinder at one side of said piston and discharging it from the other and conversely; a feed rate regulator; and means automatically adjusted by the alternate reciprocations of said carrier adapted to control said regulator to compensate for the size of said piston rod to maintain identical feeding rate during the forward and backward strokes of said carrier.

4. A machine tool combining a work support; a tool support; a cylinder; a piston and rod therein, said cylinder and piston being arranged to reciprocate one of said supports; hydraulic means for alternately supplying the opposite ends of said piston with fluid under high constant pressure and for controlling the escape of fluid from the advancing side of said piston at a volumetrically uniform rate; a trip mechanism adapted to be set in one position at the advance of said support and in another position at the retreat of said support; and means adapted by said trip for slightly decreasing said volumetric rate when the oil is flowing from the side of said cylinder occupied by said piston rod, and of slightly increasing said volumetric rate when flowing from the other end of said cylinder to maintain a substantially identical rate of feed with both the advance and return strokes of said support.

5. A machine tool combining a hydraulic motor; a carrier propelled thereby; a low pressure high capacity pump; a high pressure metering pump; a valve casing having first ports leading to and from said motor, having second ports leading to and from said low pressure high capacity pump, and having third ports leading to and from said high pressure metering pump; a single valve element in said casing adapted in one position to connect said first and second ports and to bridge together the third ports, in a succeeding position to bridge said second ports and to connect said first and third ports, in a succeeding position to connect reversely said first and second ports and to bridge said third ports, and in a succeeding position to bridge said second ports and to connect reversely said first and third ports; and means operated automatically by said carrier for shifting said valve into said positions consecutively.

6. A machine tool combining a carrier; a hydraulic motor for propelling it; a source of fluid under pressure; and a valve unit between said motor and source for admitting fluid to and from said motor, said unit comprising a casing and a single valve element each having a plurality of ports so related that when said valve element is in one position, flow to and from said motor will be prevented, and when it is shifted axially a copious flow to and from said motor will occur, and when it is then partially rotated about its axis, a relatively slow volumetrically constant flow to and from said motor will occur, and when it is then shifted longitudinally a copious flow to and from said motor will reversely occur, and when it is then partially rotated to its original position flow to and from said motor will be suspended; all imparting a one-way feed cycle to said carrier.

7. A machine tool combining a support and hydraulic means for propelling it in a reciprocating feed cycle, said means comprising a hydraulic motor; a first source of oil under high pressure; a second source of oil under low pressure; and an intervening valve unit, said valve unit comprising a casing and a single element each having a plurality of ports so arranged that when said valve unit is in one position it will effect a right handed connection between the high pressure source in said motor, when shifted longitudinally it will effect a left handed connection between said low pressure source and said motor, when then swung it will effect a left handed connection between said high pressure source and said motor, and when then shifted longitudinally it will effect a right hand connection between said low pressure source and said motor.

8. A machine tool combining a work support and a cutter support; hydraulic means for propelling one of said supports; a main valve element for determining the effect of said means, said element being rotatable and translatable; an auxiliary flow-arresting valve; trip mechanism actuated by said propelled support adapted to rotate or to translate said element; and means for tripping said auxiliary valve into its non-flow position.

9. A machine tool combining a work support and a tool support; hydraulic means for propelling one of said supports; a mechanically driven metering escapement for volumetrically controlling the return of fluid from said system; and a trip device automatically actuated by said propelled support for effecting a slight differential adjustment of said metering escapement according to the direction of travel of said propelled support.

10. A machine tool combining a work carrier; a tool carrier; a reciprocator for one of said carriers comprising a cylinder; a piston and a rod extending from one side of said piston; means for forcing oil into said cylinder at one side of said piston and discharging it from the other and conversely; a feed rate regulator; a device automatically adjusted by the alternate reciprocations of said carrier adapted to control said regulator to compensate for the size of said piston rod to maintain identical feeding rate during the forward and backward strokes of said carrier; and means for adjusting said device to yield a selective maximum rate.

11. A machine tool combining a work support; a tool support; a cylinder; a piston and rod therein, said cylinder and piston being arranged to reciprocate one of said supports; hydraulic means for alternately supplying the opposite ends of said piston with fluid under high constant pressure and for controlling the escape of fluid from the advancing side of said piston at a volumetrically uniform rate; a trip mechanism adapted to assume one position at the advance of said support and to assume another position at the retreat of said support; means adapted by said trip for slightly decreasing said volumetric rate when the oil is flowing from the side of said cylinder occupied by said piston rod, and of slightly increasing said volumetric rate when flowing from the other end of said cylinder to maintain a substantially identical rate of feed with both the advance and return strokes of said support; and a manual throw-out for said means.

12. A machine tool combining tool and work supports; power driven hydraulic means; a mechanical connection between said means and one of said supports to enable said means to shift said support by power; a valve for hydraulically locking said support; and means embodied in said mechanical connection and including a manually adjustable element and a member cooperating therewith for mechanically modifying said connection to enable the relation between said support and said hydraulic means to be manually adjusted.

13. A machine tool combining work and cutter supports; a hydraulic actuator for one of said supports; a source of high constant pressure oil; a copious source of low pressure oil; a continuously running escapement device for passing oil at selective volumetrically uniform rates; a main valve;

means automatically operated by the propelled support for cyclicly shifting said main valve selectively to open communication with said sources to cause said hydraulically actuator to propel its carrier at rapid traverse and feeding rates and to reverse the direction of propulsion; an auxiliary valve for arresting all flow to or from said hydraulic actuator; an automatic trip; and a hand lever, said trip and hand lever each being interlocked with said auxiliary valve.

14. A machine tool combining a cutter spindle; a table; a mechanical rotator for said spindle; a hydraulic actuator for said table; a source of fluid under pressure; a main valve intervening between said source and said actuator for determining the direction and rate of action of said actuator; an auxiliary valve for stopping all flow to or from said actuator; and means adapted to be operated in connection with said auxiliary valve for causing it to close when said spindle is arrested.

15. A machine tool combining a hydraulic motor; a carrier propelled thereby; a low pressure high capacity pump; a high pressure metering pump; a valve casing having ports leading to and from said motor, having ports leading to and from said low pressure high capacity pump, and having ports leading to and from said high pressure metering pump; a single valve element in said casing adapted in one position to connect said first and second ports and to bridge together the third ports, in a succeeding position to bridge said second ports and to connect said first and third ports, in a succeeding position to connect reversely said first and second ports and to bridge said third ports, and in a succeeding position to bridge said second ports and to connect reversely said first and third ports; means operated automatically by said carrier for shifting said valve into said positions consecutively; an auxiliary stop valve for arresting all flow to and from said motor; and means for positioning said stop valve.

16. A machine tool combining an hydraulic motor; a carrier propelled thereby; a source of fluid leading to said motor and a return for fluid therefrom; a valve shiftable to prevent any fluid either from entering or from leaving said motor to lock it positively against being moved and thereby to lock said carrier positively against any shift; and manual means for shifting said carrier when locked by said valve.

17. A machine tool combining a carrier; a hydraulic motor for propelling it; a source of fluid under pressure; and a valve unit between said motor and source for admitting fluid to and from said motor, said unit comprising a casing and a single valve element each having a plurality of ports so related that when said valve element is in one position, flow to and from said motor will be prevented, and when it is shifted axially a copious flow to and from said motor will occur, and when it is then partially rotated about its axis, a relatively slow volumetrically constant flow to and from said motor will occur, and when it is then shifted longitudinally a copious flow to and from said motor will reversely occur, and when it is then partially rotated to its original position flow to and from said motor will be suspended; and a mechanical connection automatically operated by said carrier for so setting said valve to impart a one-way feed cycle to said carrier.

18. A machine tool combining a support and hydraulic means for propelling it in a reciprocating feed cycle, said means comprising a hydraulic motor; a first source of oil under high pressure; a second source of oil under low pressure; an intervening valve unit, said valve unit comprising a casing and a single element each having a plurality of ports so arranged that when said valve unit is in one position it will effect a right handed connection between the high pressure source in said motor, when shifted longitudinally it will effect a left handed connection between said low pressure source and said motor, when then swung it will effect a left handed connection between said high pressure source and said motor, and when then shifted longitudinally it will effect a right hand connection between said low pressure source and said motor; and a mechanism automatically tripped by said support for setting said valve element successively in the aforesaid positions.

19. A machine tool combining a table; a hydraulic reciprocator therefor; a source of high and low pressure fluid; a single trip unit mounted adjacent said table and adapted to be oscillated or translated; valve means actuated thereby and effective when said trip element is translated to effect changes in rate but not in direction, and when said trip element, oscillated to effect changes both in rate and direction to enable said trip element automatically to impart a reciprocating feed cycle to said table; and an auxiliary valve for arresting all flow to or from said hydraulic reciprocator.

20. A machine tool, combining a translatable element; hydraulic means for translating said element, said means including a cylinder, a piston reciprocable in the cylinder, a piston rod connected at one end to said piston and also connected with said element, and means for admitting fluid under pressure alternately into opposite ends of said cylinder; variable means for controlling the rate of flow of fluid into said cylinder and thereby the rate of reciprocation of said element; and automatically actuated means to vary the rate-controlling means to compensate for the displacement of said piston rod.

21. A machine tool combining a normally stationary member; a member movable thereon; hydraulic means for reciprocating said movable member, said means including a cylinder; a piston in the cylinder, said cylinder being connected with one of said members and the piston being connected with the other of said members; means to admit fluid pressure alternately into opposite ends of said cylinder; a variable displacement pump alternately connected with the exhaust ends of said cylinder to remove therefrom measured amounts of fluid thereby to determine volumetrically the rate of relative movement between the piston and cylinder under the influence of the fluid pressure; and means actuated in timed relation with the reciprocations of said movable member to vary the action of said variable displacement pump to compensate for variances in the capacity, per unit of length, of the cylinder at opposite sides of the piston.

22. A machine tool as set forth in claim 21 in which the effective action of the pump is varied by a reciprocating rod; in which a lever acts to shift said rod to vary pump displacement and in which means, carried by the reciprocable member, acts to shift said lever, and thereby the pump controlling rod, at each reversal of the reciprocating member.

23. A hydraulic transmission comprising a cylinder, a piston reciprocable therein; means to admit fluid pressure alternately into opposite ends of said cylinder to reciprocate said piston; a variable fluid escapement device connected with the exhaust end of the cylinder and acting to permit quantities of fluid successively to be exhausted from the cylinder thereby to permit of said piston to be moved under the influence of the fluid pressure in the opposite end of the cylinder; and means to vary the action of the escapement device to compensate for variances in the capacity, per unit of length, of the cylinder at opposite sides of the piston.

24. A machine tool combining a reciprocable element; hydraulic means for reciprocating said element, said means comprising a cylinder, a piston reciprocable in said cylinder, a piston rod extending into one end of said cylinder and having said piston attached thereto, the outwardly projecting end of said rod being connected with said reciprocable element; means for admitting fluid pressure alternately into opposite ends of said cylinder; a variable escapement device automatically connected with the exhaust end of said cylinder to regulate the rate of exhaust under the influence of the fluid pressure flowing into the cylinder; and means to vary the action of the escapement device to compensate for the displacement of the piston rod, thereby to maintain a substantially uniform rate of movement of said reciprocable member in its oppositely directed reciprocations.

25. A machine tool combining a reciprocable table; hydraulic means for reciprocating said table; variable controlling means for positively determining the rate of movement of said table; compensating means actuated in timed relation with the reciprocation to vary the action of said controlling means, to compensate for variances in capacity, per unit of length, in the opposite ends of said cylinders to effect a substantially uniform rate of movement in reverse directions; and means cooperating with said compensating means initially to adjust the controlling means thereby to determine the uniform rate of movement of the table.

26. A machine tool combining relatively movable members; hydraulic means for moving one of said members in a plurality of directions and at a plurality of rates; a single valve embodied in said hydraulic means comprising a casing having a plurality of ports and a valve member movable axially and angularly in said casing and adapted by said movements selectively to open and close certain ones of said ports thereby to cause said hydraulic means to effect the various rates and direction of movement of said movable member; and automatic trip means actuated by the movement of said movable member to move said valve member to its various positions.

27. A machine tool combining relatively movable members; hydraulic means for moving one of said members in a plurality of directions and at a plurality of rates; a single valve embodied in said hydraulic means comprising a casing having a plurality of ports and a valve member movable axially and angularly in said casing and adapted by said movements selectively to open and close certain ones of said ports thereby to cause said hydraulic means to effect the various rates and direction of movement of said movable member; and automatic trip means actuated in timed relation with the movement of said movable member to move said valve member to its various positions.

28. A milling machine combining a frame; a table translatably mounted on said frame; a hydraulic transmission for translating said table on said frame, said transmission including a hydraulic motor and pump means hydraulically connected with said motor; a valve embodied in said transmission intermediate said pump means and said motor and having a portion adapted to be shifted angularly and axially to a plurality of positions to effect translation of said table in a plurality of directions and at a plurality of rates; means actuated by the movement of said table for shifting said valve to cause it to effect a predetermined cycle of movement of said table; and other valve means for locking said table against movement under the action of said hydraulic transmission.

29. A milling machine combining a frame; a table translatably mounted thereon; a hydraulic transimission for translating said table, said transmission including a hydraulic motor and pump means hydraulically connected with said motor; a first valve embodied in said transmission intermediate said pump means and said motor and having a portion adapted to be shifted angularly and axially to effect translation of said table in a plurality of directions and at a plurality of rates; a second valve in said system adapted at predetermined times to discontinue flow of fluid to and from said motor thereby to lock said table against movement; and trip mechanism actuated by the movement of said table to actuate said valves.

30. A machine tool combining a work carrier; a tool carrier; hydraulic means embodying a hydraulic motor and three pumps hydraulically connected therewith for propelling one of said carriers; a tool spindle rotatably journaled in said tool carrier; and a single prime mover operatively connected to actuate all of said pumps and to rotate said tool spindle.

31. A machine tool combining a work carrier; a tool carrier; a tool spindle journaled in said tool carrier; hydraulic means embodying a hydraulic motor operatively connected to propel one of said carriers; a high capacity low pressure pump adapted to be connected to said motor to effect rapid traverse of said propelled carrier; a high pressure pump adapted to be connected with said motor to inject into one end thereof high pressure feeding fluid; a metering escapement pump connected to the opposite end of said motor to control volumetrically the rate of exhaust therefrom and thereby the rate of feed of said carrier; a prime mover adapted to actuate said three pumps and said tool spindle; and means to connect said prime mover with said tool spindle when said metering escapement pump is rendered effective.

32. A machine tool combining a fixed member; a member movable on the fixed member; a hydraulic system for propelling said movable member in a plurality of directions and at a plurality of rates and for locking said propelled member against movement; one valve embodied in said system for effecting the variations in rate and direction of movement of said propelled member; and another valve embodied in said system for arresting the movement of the propelled member and for locking it against movement.

33. A machine tool combining a rotary cutter spindle; a support for said spindle and a support for work; hydraulic means for propelling one of said supports; mechanical means for rotating said spindle; valve means for controlling said hydraulic means thereby to give said propelled supports movements in opposite directions and at a plurality of rates; trip mechanism for actuating said valve means; a clutch embodied in said spindle rotating means for starting and stopping the rotation of said spindle; and an interlock between said trip mechanism and said clutch whereby said spindle will be caused to be rotated whenever the propelled support is in motion.

34. In a machine tool, the combination of a movable member, a transmission therefor including a hydraulically operable portion adjustable for changing the rate of movement of said member, a manually operable means for adjusting said portion for a desired rate, and independent automatic means for adjusting said portion, said automatic means including a device effective in accordance with a change in some of the operating conditions of said machine tool, and a motion transmitting connection adapted to adjust said portion to determine said rate in spite of said change in operating conditions.

35. In a machine tool, the combination of a movable member, a transmission therefor including a hydraulically operable portion adjustable for changing the rate of member movement, a device having a plurality of elements each independently movable for the adjustment of said portion, manual means for the movement of one of said elements to adjust said portion to effect a desired rate of member movement, and means automatically operative through the other of said elements effective with a change in some of the operating conditions of said machine tool, whereby to adjust said portion to determine said rate in spite of said change in operating conditions.

36. In a machine tool, the combination of a movable member, a transmission therefor including adjustable rate change means, manual means for adjusting said rate change means to approximately predetermine a rate, other means movable in one or the other direction in accordance with changes in some of the operating conditions of said machine tool, and means connecting said other means for further adjustment of said rate change means to effect the desired rate in spite of said variations in the operating conditions of said machine tool.

37. In a milling machine, the combination of a rotatable tool spindle, a support movable in a path transverse to the spindle axis, a spindle transmission including in the order recited a power source, and a rate changer, a support transmission connected to be driven from said spindle transmission to exclude said rate changer and including a fluid pump device and a fluid motor device, one of said devices being adjustable to change the rate of support movement, control means operable in accordance with variations in some of the operating conditions of said milling machine, and motion transmitting connections from said control means to said adjustable device and adapted to maintain a constant rate of support movement in spite of said variations.

38. A machine tool combining a reciprocable member; hydraulic means to reciprocate said member; variable escapement means operative to permit limited movement of said member under the influence of said hydraulic means; automatic means for varying the action of the escapement means; means to render said escapement means ineffective thereby to render the hydraulic means inoperative and to lock said member against movement; and manual means operative when said hydraulic means is inoperative to shift said table.

HANS ERNST.
LESTER F. NENNINGER.